United States Patent
Aghdaie et al.

(10) Patent No.: US 11,413,539 B2
(45) Date of Patent: *Aug. 16, 2022

(54) REALTIME DYNAMIC MODIFICATION AND OPTIMIZATION OF GAMEPLAY PARAMETERS WITHIN A VIDEO GAME APPLICATION

(71) Applicant: Electronic Arts Inc., Redwood City, CA (US)

(72) Inventors: Navid Aghdaie, San Jose, CA (US); John Kolen, Half Moon Bay, CA (US); Mohamed Marwan Mattar, San Francisco, CA (US); Mohsen Sardari, Redwood City, CA (US); Su Xue, Fremont, CA (US); Kazi Atif-Uz Zaman, Foster City, CA (US); Meng Wu, Fremont, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/518,914

(22) Filed: Jul. 22, 2019

(65) Prior Publication Data

US 2020/0078685 A1 Mar. 12, 2020

Related U.S. Application Data

(63) Continuation of application No. 15/445,784, filed on Feb. 28, 2017, now Pat. No. 10,357,718.

(51) Int. Cl.
*A63F 13/67* (2014.01)
*A63F 13/79* (2014.01)
(Continued)

(52) U.S. Cl.
CPC .............. *A63F 13/67* (2014.09); *A63F 13/79* (2014.09); *A63F 13/31* (2014.09); *A63F 13/352* (2014.09)

(58) Field of Classification Search
CPC ................................ A63F 13/67; A63F 13/79
See application file for complete search history.

(56) References Cited

U.S. PATENT DOCUMENTS

| 5,274,801 A | 12/1993 | Gordon |
| 5,683,082 A | 11/1997 | Takemoto et al. |

(Continued)

FOREIGN PATENT DOCUMENTS

| CN | 104657412 A | 5/2015 |
| KR | 10-2009-0092007 A | 8/2009 |

(Continued)

OTHER PUBLICATIONS

Chris Pruett, Defining the All-Important Difficulty Curve, The Journal of Education, Community, and Value, vol. 8, Issue 1, Jan.-Feb. 2008, http://commons.pacificu.edu/cgi/viewcontent.cgi?article=1002&context=inter08 (Year: 2008).*

(Continued)

*Primary Examiner* — Yingchuan Zhang
(74) *Attorney, Agent, or Firm* — Knobbe, Martens, Olson & Bear, LLP

(57) ABSTRACT

Embodiments presented herein include systems and methods for performing dynamic difficulty adjustment. Further, embodiments disclosed herein perform dynamic difficulty adjustment using processes that may not be detectable or are more difficult to detect by users compared to static and/or existing difficulty adjustment processes. In some embodiments, historical user information utilized by a machine learning system to generate a prediction model that predicts an expected duration of game play, such as for example, an (Continued)

expected churn rate, a retention rate, the length of time a user is expected to play the game, or an indication of the user's expected game play time relative to a historical set of users who have previously played the game. Before or during game play, the prediction model can be applied to information about the user to predict the user's expected duration of game play. Based on the expected duration, in some embodiments, the system may then utilize a mapping data repository to determine how to dynamically adjust the difficulty of the game, such as, for example, changing the values of one or more gameplay parameters to make portions of the game less difficult.

20 Claims, 14 Drawing Sheets

(51) Int. Cl.
  *A63F 13/31* (2014.01)
  *A63F 13/352* (2014.01)

(56) References Cited

U.S. PATENT DOCUMENTS

| | | | |
|---|---|---|---|
| 6,106,395 | A | 8/2000 | Begis |
| 6,253,193 | B1 | 6/2001 | Ginter et al. |
| 6,285,380 | B1 | 9/2001 | Perlin |
| 7,390,254 | B2 | 6/2008 | Hirai |
| 7,636,701 | B2 | 12/2009 | Funge et al. |
| 8,100,770 | B2 | 1/2012 | Yamazaki et al. |
| 8,142,282 | B2 | 3/2012 | Canessa et al. |
| 8,267,764 | B1 | 9/2012 | Aoki et al. |
| 8,398,476 | B1 | 3/2013 | Sidhu et al. |
| 8,540,560 | B2 | 9/2013 | Crowley et al. |
| 8,821,290 | B2 | 9/2014 | Fujisawa et al. |
| 8,907,193 | B2 | 12/2014 | Cross et al. |
| 8,914,251 | B2 | 12/2014 | Ohta |
| 9,001,118 | B2 | 4/2015 | Molyneaux et al. |
| 9,013,489 | B2 | 4/2015 | Evertt et al. |
| 9,033,796 | B2 | 5/2015 | Fujisawa et al. |
| 9,069,441 | B2 | 6/2015 | Jacob |
| 9,616,329 | B2 | 4/2017 | Szufnara et al. |
| 9,734,594 | B2 | 8/2017 | Auclair et al. |
| 9,919,217 | B2 | 3/2018 | Aghdaie et al. |
| 10,004,984 | B2 | 6/2018 | Voris et al. |
| 10,105,603 | B2 | 10/2018 | Bucher |
| 10,286,323 | B2 | 5/2019 | Aghdaie et al. |
| 10,357,718 | B2 | 7/2019 | Aghdaie et al. |
| 10,403,001 | B2 | 9/2019 | Auclair et al. |
| 10,478,730 | B1 | 11/2019 | Burnett |
| 10,569,176 | B2 | 2/2020 | D'angelo et al. |
| 10,713,543 | B1 | 7/2020 | Skuin et al. |
| 10,799,798 | B2 | 10/2020 | Aghdaie et al. |
| 10,807,004 | B2 | 10/2020 | Aghdaie et al. |
| 10,839,215 | B2 | 11/2020 | Somers et al. |
| 10,940,393 | B2 | 3/2021 | Somers et al. |
| 10,953,334 | B2 | 3/2021 | Kolen et al. |
| 11,276,216 | B2 | 3/2022 | Borovikov et al. |
| 2004/0067788 | A1 | 4/2004 | Angelopoulos |
| 2004/0152512 | A1 | 8/2004 | Colledi et al. |
| 2005/0130725 | A1 | 6/2005 | Creamer et al. |
| 2007/0054717 | A1 | 3/2007 | Youm et al. |
| 2007/0060364 | A1 | 3/2007 | Osgood et al. |
| 2007/0066403 | A1 | 3/2007 | Conkwright |
| 2007/0260567 | A1 | 11/2007 | Funge et al. |
| 2008/0097948 | A1 | 4/2008 | Funge et al. |
| 2008/0266250 | A1 | 10/2008 | Jacob |
| 2008/0268961 | A1 | 10/2008 | Brook |
| 2009/0202114 | A1 | 8/2009 | Morin et al. |
| 2009/0307671 | A1 | 12/2009 | White et al. |
| 2010/0144444 | A1 | 6/2010 | Graham |
| 2010/0302257 | A1 | 12/2010 | Perez et al. |
| 2011/0007079 | A1 | 1/2011 | Perez et al. |
| 2011/0035280 | A1 | 2/2011 | Fordyce, III |
| 2011/0295649 | A1 | 12/2011 | Fine et al. |
| 2012/0083330 | A1 | 4/2012 | Ocko |
| 2012/0115580 | A1 | 5/2012 | Hornik et al. |
| 2012/0220376 | A1 | 8/2012 | Takayama et al. |
| 2012/0233105 | A1 | 9/2012 | Cavallaro et al. |
| 2012/0244941 | A1 | 9/2012 | Ostergren et al. |
| 2012/0276964 | A1 | 11/2012 | Jones et al. |
| 2012/0295708 | A1 | 11/2012 | Hernandez et al. |
| 2012/0309520 | A1 | 12/2012 | Evertt et al. |
| 2013/0178281 | A1 | 7/2013 | Ayyar et al. |
| 2013/0316779 | A1 | 11/2013 | Vogel |
| 2013/0316795 | A1 | 11/2013 | Vogel |
| 2013/0342527 | A1 | 12/2013 | Molyneaux et al. |
| 2014/0235346 | A1 | 8/2014 | Kim et al. |
| 2014/0249961 | A1 | 9/2014 | Zagel et al. |
| 2014/0274370 | A1 | 9/2014 | Shah |
| 2015/0105161 | A1* | 4/2015 | Sumaki .................. A63F 13/67 463/42 |
| 2015/0213646 | A1 | 7/2015 | Ma et al. |
| 2015/0302505 | A1 | 10/2015 | Di et al. |
| 2015/0339532 | A1 | 11/2015 | Sharma et al. |
| 2016/0005270 | A1 | 1/2016 | Marr et al. |
| 2016/0067612 | A1* | 3/2016 | Ntoulas .................. A63F 13/79 463/29 |
| 2017/0061685 | A1 | 3/2017 | Auclair et al. |
| 2017/0064284 | A1 | 3/2017 | Auclair |
| 2017/0124753 | A1 | 5/2017 | Arisman |
| 2017/0312634 | A1 | 11/2017 | Ledoux et al. |
| 2017/0365102 | A1 | 12/2017 | Huston et al. |
| 2018/0001216 | A1 | 1/2018 | Bruzzo et al. |
| 2018/0117465 | A1 | 5/2018 | Voris et al. |
| 2018/0161673 | A1 | 6/2018 | Pasternack et al. |
| 2018/0161682 | A1 | 6/2018 | Myhill |
| 2018/0169526 | A1 | 6/2018 | Aghdaie et al. |
| 2019/0087965 | A1 | 3/2019 | Datta |
| 2019/0184286 | A1 | 6/2019 | Du et al. |
| 2019/0197402 | A1 | 6/2019 | Kovacs et al. |
| 2019/0294881 | A1 | 9/2019 | Polak et al. |
| 2019/0354759 | A1 | 11/2019 | Somers et al. |
| 2019/0388789 | A1 | 12/2019 | Aghdaie et al. |
| 2020/0098173 | A1 | 3/2020 | McCall |
| 2020/0193671 | A1 | 6/2020 | Tamir |
| 2020/0306640 | A1 | 10/2020 | Kolen et al. |
| 2020/0342677 | A1 | 10/2020 | Molyneaux et al. |
| 2021/0001229 | A1 | 1/2021 | Somers et al. |
| 2021/0008456 | A1 | 1/2021 | Somers et al. |
| 2021/0027119 | A1 | 1/2021 | Skuin et al. |
| 2021/0086083 | A1 | 3/2021 | Aghdaie et al. |
| 2021/0093974 | A1 | 4/2021 | Aghdaie et al. |
| 2021/0275925 | A1 | 9/2021 | Kolen et al. |

FOREIGN PATENT DOCUMENTS

| | | |
|---|---|---|
| KR | 10-2012-0052228 | 5/2012 |
| KR | 10-2013-0118433 A | 10/2013 |
| KR | 10-2014-0033088 | 3/2014 |
| KR | 101603681 B1 | 3/2016 |
| KR | 10-2016-0115959 | 10/2016 |
| KR | 10-2016-0145732 | 12/2016 |

OTHER PUBLICATIONS

Aponte et al., "Measuring the level of difficulty in single player video games," Elsevier, Entertainment Computing (2011) 205-213.
Pittman, "The Pac-Man Dossier," Gamasutra, downloaded on Jun. 1, 2018, available at <<https://web.archive.org/web/20161107115846/https://www.gamasutra.com/view/feature/3938/the_pacman_dossier.php?print=1>>.
Pruett, "Defining the All-Important Difficulty Curve," J of Ed, Comm & Value, vol. 8:1, Jan.-Feb. 2008, http://com mons.pacificu.edu/cg i/viewcontent.cg i?article= 1002&context=inter08 Pruett, "Defining the All-Important Difficulty Curve," J of Ed, Comm & Value, vol. 8:1, Jan.-Feb. 2008, http://com mons.pacificu. edu/cg i/viewcontent.cg i?article= 1002&context=inter08.
Shorten, "Image-to-Image Translation with Conditional Adversarial Networks," Pix2Pix, https://towardsdatascience.com/pix2pix.869c17900998?gi=e4c177e8a7c7 (Jan. 29, 2019).

(56) References Cited

OTHER PUBLICATIONS

Mehta et al., "Vnect: Real-time 3D Human Pose Estimation with a Single RGB Camera," ACM Transactions on Graphics, vol. 36:4 (Jul. 2017).

Shih et al., "Video-based Motion Capturing for Skelton-based 3D Models," National Taiwan University.

Van de Panne, "Control for Simulated Human and Animal Motion," Dept Comp Sci, University of Toronto (1998).

Davis et al., "A Sketching Interface for Articulated Figure Animation," Eurographics-SIGGRAPH Symp on Comp Animation (2003).

Isola et al., "Image-to-Image Translation with Conditional Adversarial Networks," BAIR Lab, UC Berkeley (Nov. 26, 2018).

Aristidou et al., "Inverse Kinematics Techniques in Computer Graphics: A Survey," Comp Graphics Forum, vol. 00:1-24 (2017).

Bengio, et al, Curriculum Learning, Proceedings of the 26th International Conference on Machine Learning, 2009, in 8 pages.

Biggs et al., "Creatures Great and SMAL: Recovering the Shape and Motion of Animals from Video", Dec. 6, 2018, Springer, Computer Vision—ACCV: Asian Conference on Computer Vision 2018, pp. 3-19.

Chen et al., "Visualization System for Animating Vertebrate Animal Models", 2012, IEEE, 2012 Conference on Technologies and Applications of Artificial Intelligence, pp. 244-249.

Chou et al., "Self Adversarial Training for Human Pose Estimation", Nov. 15, 2018, APSIPA, Proceedings, APSIPA Annual Summit and Conference 2018, pp. 17-30.

Donges, Niklas, Transfer Learning—Towards Data Science, Apr. 23, 2018, https://towardsdatascience.com/transfer-learning-946518f95666.

Du et al., "Hierarchical Recurrent Neural Network for Skeleton Based Action Recognition", Jun. 2015, IEEE, The IEEE Conference on Computer Vision and Pattern Recognition (CVPR) 2015, pp. 1110-1118.

Ho, et al, Generative Adversarial Imitation Learning, pp. 1-14, arXiv:1606.03476v1 [cs.LG]; Jun. 10, 2016.

Kanazawa et al., "Learning Category-Specific Mesh Reconstruction from Image Collections", 2018, The European Conference on Computer Vision (ECCV), pp. 371-386.

Zweng et al., "Unexpected Human Behavior Recognition in Image Sequences using Multiple Features", Aug. 26, 2010, IEEE, 2010 20th International Conference on Pattern Recognition, pp. 368-371.

* cited by examiner

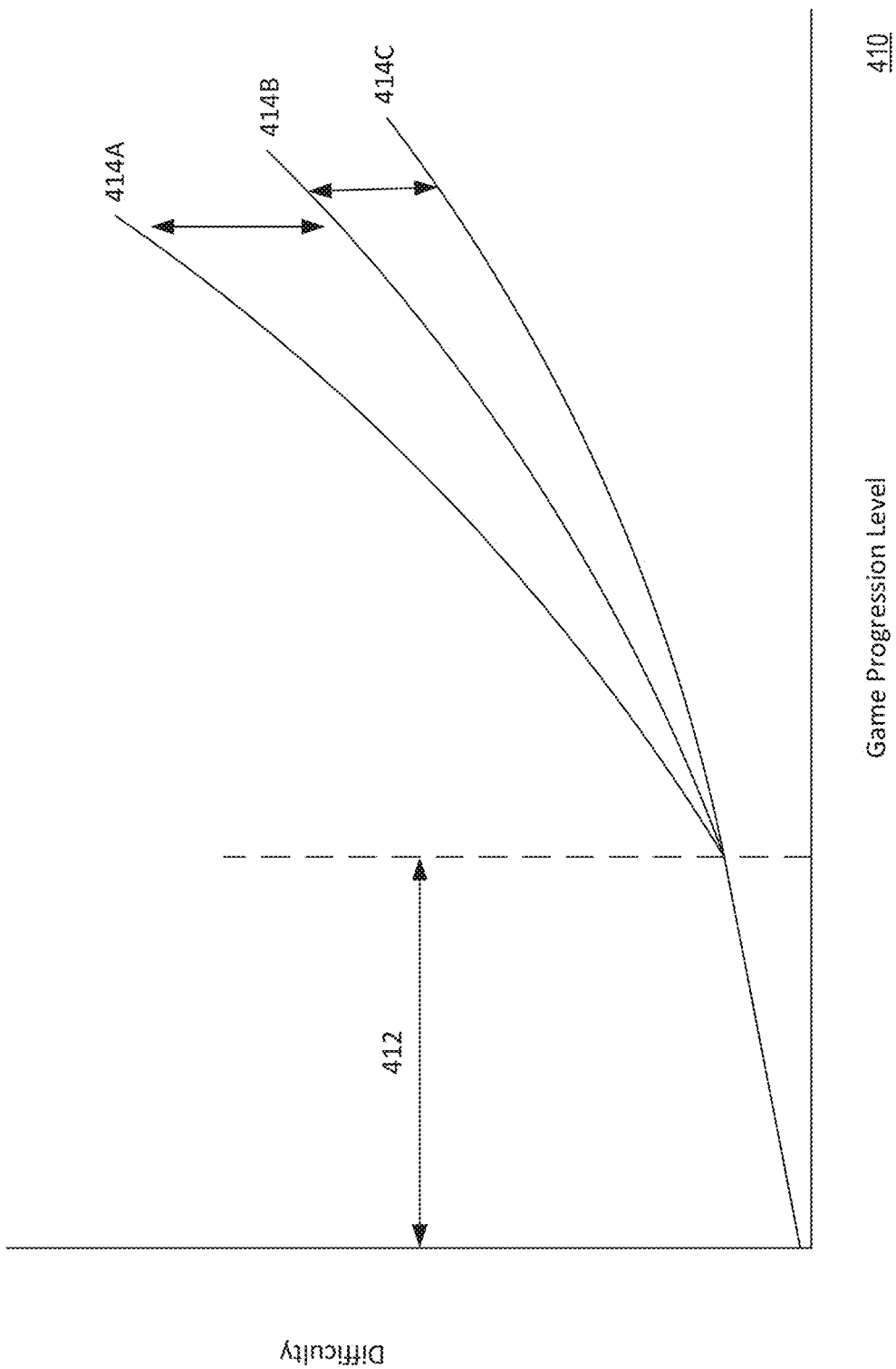

REALTIME DYNAMIC MODIFICATION AND OPTIMIZATION OF GAMEPLAY PARAMETERS WITHIN A VIDEO GAME APPLICATION

INCORPORATION BY REFERENCE TO ANY PRIORITY APPLICATIONS

Any and all applications for which a foreign or domestic priority claim is identified in the Application Data Sheet as filed with the present application are incorporated by reference under 37 CFR 1.57 and made a part of this specification.

BACKGROUND

Software developers typically desire for their software to engage users for as long as possible. The longer a user is engaged with the software, the more likely that the software will be successful. The relationship between the length of engagement of the user and the success of the software is particularly true with respect to video games. The longer a user plays a particular video game, the more likely that the user enjoys the game and thus, the more likely the user will continue to play the game.

Often, games that are too difficult or too easy will result in less enjoyment for a user. Consequently, the user is likely to play the game less. Thus, one of the challenges of game development is to design a game with a difficulty level that is most likely to keep a user engaged for a longer period of time.

SUMMARY OF EMBODIMENTS

The systems, methods and devices of this disclosure each have several innovative aspects, no single one of which is solely responsible for the all of the desirable attributes disclosed herein. Details of one or more implementations of the subject matter described in this specification are set forth in the accompanying drawings and the description below.

In certain embodiments, a computer-implemented method for dynamically adjusting a gameplay parameter of a video game application is provided. The method may be performed under control of one or more hardware computing devices configured with specific computer-executable instructions, the specific computer-executable instructions stored in an electronic hardware memory. The method may comprise receiving, over a network from a user computing system, a gameplay session data packet comprising an indication of initiation of a current gameplay session of a video game application on the user computing system. The method may further comprise identifying a user identifier associated with the current gameplay session of the video game application on the user computing device from the gameplay session data packet, the user identifier associated with a user account. The method may further comprise accessing user account data in a physical data store based at least in part on the user identifier, wherein the physical data store is configured to store user account data structures storing user interaction data associated with one or more gameplay sessions of the video game application. The method may further comprise determining a difficulty trajectory associated with the user based at least in part on an analysis of at least a portion of the user account data using a difficultly analysis model, the difficulty trajectory indicating a predicted challenge level of associated with the user account. The method may further comprise determining a difficulty level for the current gameplay session of the video game application based at least in part on the predicted challenge level and gameplay session data associated with the current gameplay session. The method may further comprise, based at least in part on the determined difficulty level, selecting a value for a value for at least one gameplay parameter associated with the video game application, wherein the gameplay parameter comprises a variable that when adjusted causes a modification to a state of the video game. The method may further comprise modifying execution of the video game application by adjusting the gameplay parameter to the selected value for the current gameplay session.

In certain embodiments, a system for dynamically adjusting a gameplay parameter of a video game application is provided. The system may comprise an electronic data store configured to store user account data structures storing user interaction data associated with one or more gameplay sessions of the video game application. The system may further comprise a hardware processor in communication with the electronic data store, the hardware processor configured to execute specific computer-executable instructions. The instructions may be configured to cause the processor to receive, over a network from a user computing system, a gameplay session data packet comprising an indication of initiation of a current gameplay session of a video game application on the user computing system. The instructions may further be configured to cause the processor to identify a user identifier associated with the current gameplay session of the video game application on the user computing device from the gameplay session data packet, the user identifier associated with a user account. The instructions may further be configured to cause the processor to access user account data in a physical data store based at least in part on the user identifier, wherein the physical data store is configured to store user account data structures storing user interaction data associated with one or more gameplay sessions of the video game application. The instructions may further be configured to cause the processor to determine a difficulty trajectory associated with the user based at least in part on an analysis of at least a portion of the user account data using a difficultly analysis model, the difficulty trajectory indicating a predicted challenge level of associated with the user account. The instructions may further be configured to cause the processor to determine a difficulty level for the current gameplay session of the video game application based at least in part on the predicted challenge level and gameplay session data associated with the current gameplay session. The instructions may further be configured to cause the processor to, based at least in part on the determined difficulty level, selecting a value for a value for at least one gameplay parameter associated with the video game application, wherein the gameplay parameter comprises a variable that when adjusted causes a modification to a state of the video game. The instructions may further be configured to cause the processor to modify execution of the video game application by adjusting the gameplay parameter to the selected value for the current gameplay session.

In certain embodiments, a non-transitory computer-readable storage medium storing computer executable instructions for dynamically adjusting a gameplay parameter of a video game application is provided. The instructions may be under control of one or more hardware computing devices configured with specific computer-executable instructions, the specific computer-executable instructions stored in an electronic hardware memory. The instructions may comprise receiving, over a network from a user computing system, a gameplay session data packet comprising an indication of initiation of a current gameplay session of a video game application on the user computing system. The instructions may further comprise identifying a user identifier associated with the current gameplay session of the video game application on the user computing device from the gameplay session data packet, the user identifier associated with a user account. The instructions may further comprise accessing user account data in a physical data store based at least in part on the user identifier, wherein the physical data store is configured to store user account data structures storing user interaction data associated with one or more gameplay sessions of the video game application. The instructions may further comprise determining a difficulty trajectory associated with the user based at least in part on an analysis of at least a portion of the user account data using a difficultly analysis model, the difficulty trajectory indicating a predicted challenge level of associated with the user account. The instructions may further comprise determining a difficulty level for the current gameplay session of the video game application based at least in part on the predicted challenge level and gameplay session data associated with the current gameplay session. The instructions may further comprise, based at least in part on the determined difficulty level, selecting a value for a value for at least one gameplay parameter associated with the video game application, wherein the gameplay parameter comprises a variable that when adjusted causes a modification to a state of the video game. The instructions may further comprise modifying execution of the video game application by adjusting the gameplay parameter to the selected value for the current gameplay session.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

FIG. 4B illustrates a graph showing examples of difficulty trajectories that may be configured for a game, in accordance with some embodiments

DETAILED DESCRIPTION OF EMBODIMENTS

Introduction

Figure 1A:
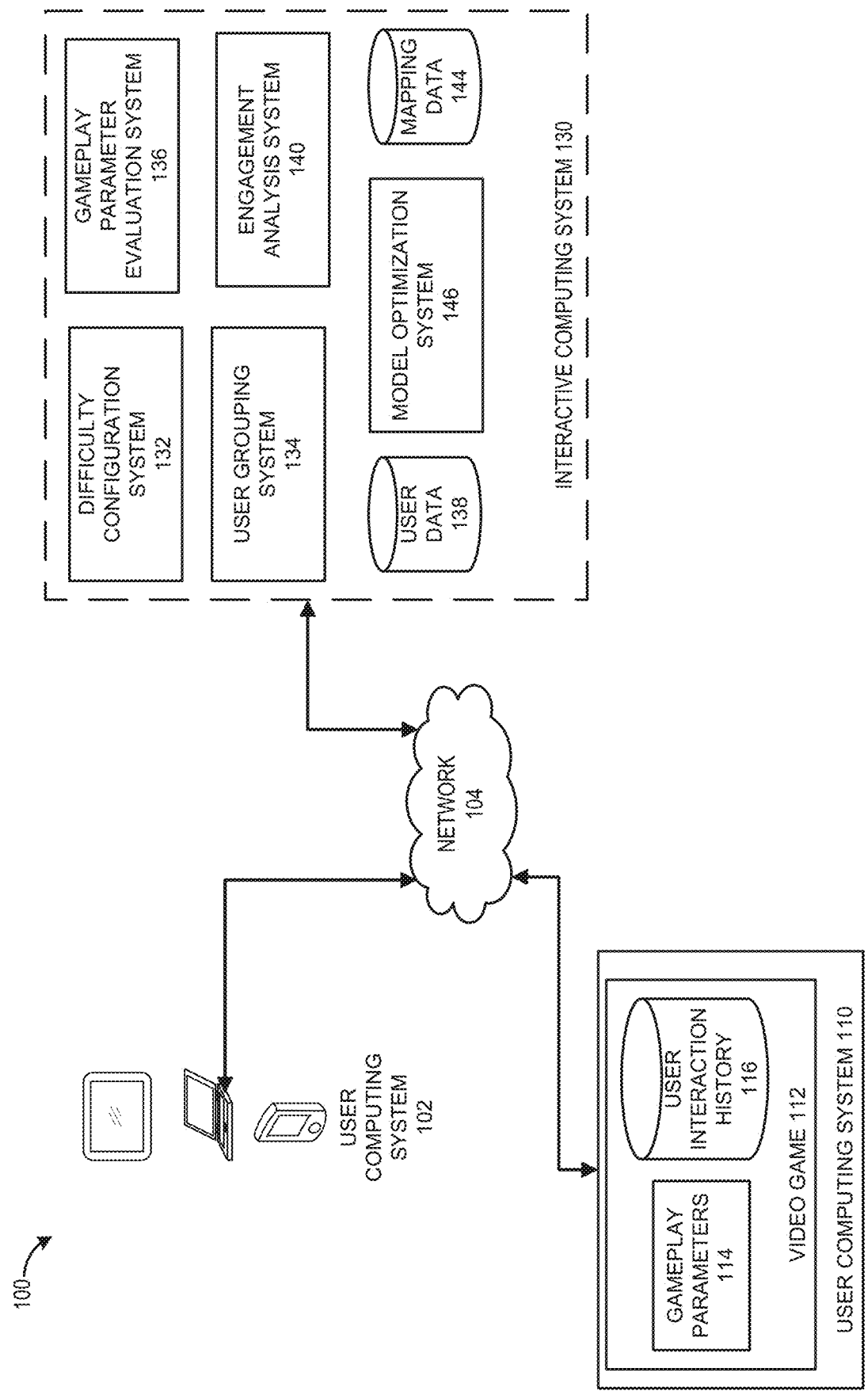
FIG. 1A illustrates an embodiment of a networked computing environment that can implement one or more embodiments of a dynamic difficulty adjustment system.

It is generally desirable for a video game to appeal to a large number of users. However, different users have different levels of skill and/or abilities when it comes to playing video games or video games of a particular genre or type. Further, different users have different desires with respect to how challenging a video game is to play. For example, some users prefer video games that are relatively challenging. These types of users may tend to be more engaged by a video game that may require a lot of practice to master and typically may not mind repeating the same portion of the video game numerous times before being successful. In contrast, some users prefer video games that are relatively easy. These types of users may tend to be more engaged by a video game where obstacles are easily overcome and the users rarely are required to repeat a portion of the video game to be successful.

One solution to the above challenges is for video game developers to incorporate multiple static difficulty levels within a particular video game. However, there are generally a limited number of static difficulty levels that a developer can add due, for example, to storage constraints, development time constraints, and the challenge of predicting a large number of difficulty levels for a large number of user preferences. Difficulty levels can be created by adjusting a defined set of adjustable gameplay parameters. However, static difficulty levels may result in an inconsistent challenge throughout the video game because a particular user may find a particular aspect of a video game challenging, but another aspect of the video game not challenging.

Another solution is to vary the ability of the user or the user's competitor based on the relationship between the user and the user's competitor. This may be used in some types of competitive video games, such as racing games. For example, if the video game is a racing game, the user's car may be made faster when the user is doing poorly and may be made slower when the user is doing well. This solution may result in what is sometimes referred to as a "rubber band effect." This solution can be noticeable by the user because the user's vehicle will behave inconsistently based on the location of the vehicle with respect to the user's competitor.

Embodiments presented herein include systems and methods for performing dynamic difficulty adjustment. Further, embodiments disclosed herein perform dynamic difficulty adjustment using processes that may not be detectable or are more difficult to detect by users compared to static and/or existing difficulty adjustment processes. In some embodiments, historical user information utilized by a machine learning system to generate a prediction model that predicts an expected duration of game play, such as for example, an expected churn rate, a retention rate, the length of time a user is expected to play the game, or an indication of the user's expected game play time relative to a historical set of users who have previously played the game. Before or during game play, the prediction model can be applied to information about the user to predict the user's expected duration of game play. Based on the expected duration, in some embodiments, the system may then utilize a mapping data repository to determine how to dynamically adjust the difficulty of the game, such as, for example, changing the values of one or more gameplay parameters to make portions of the game less difficult.

In certain embodiments, systems disclosed herein monitor user activity with respect to one or more video games to determine a user's preferences regarding game difficulty and the user's skill level with respect to playing the video games. This information may be determined based at least in part on factors that are associated with a user's engagement level. For example, a user who plays a video game for an above average length of time and who spends money while playing the video game may have a higher level of engagement than a user who plays a video game for a short period of time. As another example, a user who plays a video game for a short period of time, but who plays an above average number of play sessions may be associated with a high level of engagement, but may be classified differently than the user of the previous example. In some embodiments, engagement level may be customized differently for different games. For example, engagement level with a game having in-game purchases may be determined differently from a game that does not have in-game purchases.

Further, in certain embodiments described herein, users may be grouped with other users who have similar preferences. The users may be grouped based on user behavior with respect to challenges or obstacles presented in the video game. Each of the groups of users may be associated with difficulty preferences or settings for one or more video games. Using this information, one or more aspects of the video game can be dynamically adjusted to present a user of the video game with a particular difficulty level that is most likely to engage the user, or more likely to engage the user than a static set of difficulty levels. As noted above and further herein, additional or alternative embodiments described herein may determine one or more seeds or gameplay parameter values for adjusting the difficulty of the video game by using one or more parameter functions or prediction models. For example, certain embodiments disclosed herein may use a regression model to fit historical user data. After obtaining an initial version of the regression model, it can be applied to additional players to facilitate the dynamic difficulty analysis and/or adjustment.

Moreover, in certain embodiments described herein, the user's activity with respect to the video game can be monitored or reviewed to determine the user's behavior with respect to the video game. This monitoring may occur substantially in real-time, or at some period of time after the user has completed a play session. The play session may be a period of time when the user plays the video game and/or a particular attempt to play the game that ends with the user completing or failing to complete the video game or a portion thereof. For example, one play session may begin with the user initiating a new instance of game play and end with the user running out of lives in the game. As another example, one play session may begin with the user initiating the video game and ending when the user exits the video game. As another example, a play session may be each time a user begins a level or sub-level within the video game.

In some cases, monitoring the user's behavior with respect to the video game may enable a determination of the user's skill level and challenge level. Based at least in part on this information, the difficulty of the video game, or portions of the video game, can be adjusted from the initial difficulty level determined based on the associated user group for the user. In some embodiments, gameplay parameters used by the video game during the course of gameplay by one or more users may also be monitored. For example, by monitoring gameplay parameters over one or more sessions, correlations between different gameplay parameters and player behaviors may be identified.

Advantageously, in certain embodiments, by using a predictive model to group users with similar characteristics with respect to playing video games in order to predict optimal difficulty levels for individual users and to adjust difficulty levels based on individual user actions with respect to the video games, a more fine-grained management of difficulty level is possible compared to systems that do not monitor user behavior to determine a difficulty level. Further, although this disclosure focuses on adjusting settings of a video game that modify the difficulty level or challenge presented by the video game, this disclosure is not limited as such. Embodiments of the present disclosure can be used to modify various aspects of a video game, which may or may not affect the difficulty level of the video game. For example, in a game where weapons are randomly dropped, if it is determined that a user prefers to play a game using a particular in-game weapon, the game may be adjusted to present the preferred weapon to the user more frequently. In some cases, such as when all weapons are evenly balanced, the type of weapon dropped may not impact the difficulty of the video game and thus, such an adjustment may be based on user play styles or preferences rather than difficulty level preferences. Some other non-limiting examples of features of the video game that can be modified, which may or may not be detectable by the user can include providing extra speed to an in-game character, improving throwing accuracy of an in-game character, improving the distance or height that the in-game character can jump, adjusting the responsiveness of controls, and the like. In some cases, the adjustments may additionally or alternatively include reducing the ability of an in-game character rather than improving the ability of the in-game character. For example, the in-game character may be made faster, but have less shooting accuracy. In some embodiments, a quantity of in-game resources available to the player may be adjusted (for example, lives, potions, in-game currency).

Further, embodiments of the systems presented herein can adjust the difficulty level of the video game substantially in real time based at least in part on the user's skill level and whether the user is successfully completing challenges within the video game. However, the present disclosure is not limited as such. For example, the difficulty level of the video game may be adjusted based at least in part on user preferences, which may or may not correspond to a user's ability. For example, some users may prefer to play video games at the most difficult settings regardless of whether they are successful at completing the video game or objectives therein. By tracking user actions with respect to playing a video game, the difficulty level of the video game can be adjusted to match a particular user's preferences and/or skill level.

To simplify discussion, the present disclosure is primarily described with respect to a video game. However, the present disclosure is not limited as such may be applied to other types of applications. For example, embodiments disclosed herein may be applied to educational applications or other applications that may be modified based on a history of user interactivity with the application. Further, the present disclosure is not limited with respect to the type of video game. The use of the term "video game" herein includes all types of games, including, but not limited to web-based games, console games, personal computer (PC) games, computer games, games for mobile devices (for example, smartphones, portable consoles, gaming machines, or wearable devices, such as virtual reality glasses, augmented reality glasses, or smart watches), or virtual reality games, as well as other types of games.

Example Networked Computing Environment

FIG. 1A illustrates an embodiment of a networked computing environment 100 that can implement one or more embodiments of a dynamic difficulty adjustment system. The networked computing environment 100 includes a user computing system 110 that can communicate with an interactive computing system 130 via a network 104. Further, the networked computing environment 100 may include a number of additional user computing systems 102. At least some of the user computing systems 102 may be configured the same as or similarly to the user computing system 110.

Video Game Application

User computing system 110 may include or host a video game application 112, also referred to a video game. In some cases, the video game 112 may execute entirely on the user computing system 110. In other cases, the video game 112 may execute at least partially on the user computing system 110 and at least partially on the interactive computing system 130. In some cases, the video game 112 may execute entirely on the interactive computing system 130, but a user may interact with the video game 112 via the user computing system 110. For example, the game may be a massively multiplayer online role-playing game (MMORPG) that includes a client portion executed by the user computing system 110 and a server portion executed by one or more application host systems (not shown) that may be included as part of the interactive computing system 130. As another example, the video game 112 may be an adventure game played on the user computing system 110 without interacting with the interactive computing system 130.

Gameplay Parameters

The video game 112 may include a number of gameplay parameters 114 that describe some aspect of the video game 112 (for example, modify or affect the state of the video game 112). Typically, the gameplay parameters 114 are variables that affect the execution or operation of the video game 112. In some cases, the gameplay parameters 114 are state variables that directly modify the execution of the video game 112. In other cases, the gameplay parameters 114 are seeds or seed variables that may alter the probability of an occurrence within the video game 112 or a random (or pseudorandom) configuration or event within the video game 112. For example, one seed may correspond to and impact the generation of a level layout in the video game 112. As another example, one seed may correspond to and impact the number of occurrences of item drops or the types of items dropped as a user plays the video game 112. In some cases, the seed value is a value that initializes or influences a random or pseudorandom number generator. In some such cases, the random number generated based on the seed value may be utilized by one or more functions of the video game 112 to influence the operation of the video game 112. The gameplay parameters can include any type of variable that may modify execution of the video game 112. In some embodiments, the gameplay parameters can include other variables that may affect the user's ability to play the video game but may not necessary modify execution of the video game, such as in-game resources (for example, extra lives, potions) or currency. The system may modify execution of the video game by adjusting any type of gameplay parameter that can change the video game 112 and may conduct an analysis of the churn rate based on a specific gameplay parameter.

Generally, the gameplay parameters 114 are variables that relate to a difficulty level of the video game 112. The gameplay parameters 114 can include a subset of variables that modify the operation of video game 112, and the video game 112 may include other variables not involved in the setting of the difficulty level of video game 112 and/or not available for modification. Further, the gameplay parameters 114 may include variables that modify the video game 112 in a manner that is not perceivable by a user or is difficult to perceive by the user. In some cases, whether or not the modification to the video game 112 is perceivable by the user may depend on the specific video game. For example, suppose that one gameplay parameter 114 relates to the amount of life of an enemy in the video game 112. In some cases, modifying the value assigned to the gameplay parameter 114 may be detectable by a user because, for example, the health of the enemy is numerically presented to the user. In such cases, the health of the enemy may remain unmodified in the difficulty level of video game 112, but the difficulty level of the video game 112 may be modified via a different gameplay parameter 114. However, in some cases, modifying the health of the enemy may not be detectable by the user because, for example, the health of the enemy is not presented to the user.

User Interaction History Repository

In some embodiments, the video game 112 may include a user interaction history repository 116. The user interaction history repository 116 may store data or information relating to the user's historical interaction with the video game 112. This user interaction information or data may include any type of information associated with the video game 112. The user interaction history can be used to determine a user's level of engagement with the video game 112 and/or the difficulty of the video game 112. For example, some non-limiting examples of the user interaction information may include information relating to actions taken by the user within the video game 112; a measure of the user's progress within the video game 112; whether the user was successful at performing specific actions within the video game 112 or completing particular objectives within the video game 112; how long it took the user to complete the particular objectives; how many attempts it took the user to complete the particular objectives; how much money the user spent with respect to the video game 112, which may include one or both of the amount of money spent to obtain access to the video game 112 and the amount of money spent with respect to the video game 112 exclusive of money spent to obtain access to the video game 112; how frequently the user accesses the video game 112; how long the user plays the video game 112; and the like. The user computing system 110 may share the user interaction information with the interactive computing system 130 via the network 104. In some embodiments, some or all of the user interaction information is not stored by the video game 112, but is instead provided to or determined by another portion of the user computing system 110 external to the video game 112 and/or by the interactive computing system 130. In some embodiments, the user interaction history repository 116 may be optional or omitted.

User Computing System

The user computing system 110 may include hardware and software components for establishing communications over a communication network 104. For example, the user computing system 110 may be equipped with networking equipment and network software applications (for example, a web browser) that facilitate communications via a network (for example, the Internet) or an intranet. The user computing system 110 may have varied local computing resources, such as central processing units and architectures, memory, mass storage, graphics processing units, communication network availability and bandwidth, and so forth. Further, the user computing system 110 may include any type of computing system. For example, the user computing system 110 may include any type of computing device(s), such as desktops, laptops, video game platforms, television set-top boxes, televisions (for example, Internet TVs), network-enabled kiosks, car-console devices, computerized appliances, wearable devices (for example, smart watches and glasses with computing functionality), and wireless mobile devices (for example, smart phones, PDAs, tablets, or the like), to name a few. In some embodiments, the user computing system 110 may include one or more of the embodiments described below with respect to FIG. 10 and FIG. 11.

As previously discussed, it may be desirable to maintain or increase a user's level of engagement with the video game 112. One solution for maintaining or increasing the user's level of engagement with the video game 112 includes utilizing a difficulty configuration system (for example, difficulty configuration system 132) configured to dynamically set or adjust a difficulty level of the video game 112 based at least in part on a user's skill and/or a challenge level associated with the user when playing the video game 112. The interactive computing system 130 can determine a level of difficulty for the video game 112 for a particular user and can modify the difficulty of the video game 112 based on the determination. This determination of the difficulty level, as will be described in more detail below, may be made based at least in part on user interaction information with respect to the video game 112 and/or other video games accessible by the user.

Interactive Computing System

Embodiments of an interactive computing system 130 may include a number of systems or subsystems for facilitating the determination of the difficulty level for the video game 112 for a particular user and the modification of the difficulty level based on the determination. These systems or subsystems can include a difficulty configuration system 132, a user grouping system 134, a gameplay evaluation system 136, a user data repository 138, an engagement analysis system 140, a mapping data repository 144, and a model generation system 146. Each of these systems may be implemented in hardware, and software, or a combination of hardware and software. Further, each of these systems may be implemented in a single computing system comprising computer hardware or in one or more separate or distributed computing systems. Moreover, while these systems are shown in FIG. 1A to be stored or executed on the interactive computing system 130, it is recognized that in some embodiments, part or all of these systems can be stored and executed on the user computing system 110 or another system.

In some embodiments, when the user computing system 110 is connected or in communication with the interactive computing system 130 via the network 104, the interactive computing system 130 may perform the processes described herein. However, in some cases where the user computing system 110 and the interactive computing system 130 are not in communication, the user computing system 110 may perform certain processes described herein using information of the user that may be stored in the user interaction history repository 116.

User Data Repository

Embodiments of the user data repository 138 can store user interaction information associated with one or more users' interaction with the video game 112 and/or one or more other video games. This user interaction information can be obtained over one or more play sessions of the video game 112. Further, the user data repository 138 can store user group information associated with one or more user groups generated by the user grouping system 134. In some cases, at least some of the data stored in the user data repository 138 may be stored at a repository of the user computing system 110. Each of the repositories described herein may include non-volatile memory or a combination of volatile and nonvolatile memory.

In some embodiments, the user data repository 138 may store one or more user profiles each corresponding to a particular user, based upon the obtained user interaction information. For example, a user profile for a particular user may be used to collect and aggregate the user interaction information for the user over a plurality of play sessions.

In some embodiments, the user profile for a particular user may also define one or more attributes of the user by aggregating collected user data. Attributes may correspond to any type of value indicating an aspect of the user's behavior with regards to the video game 112, such as a determined skill level of the user, a total length of time the user has played the game, average session time, high score, average score, kills/deaths, average attempts per level, highest number of attempts for a level, and/or the like. In some embodiments, a user profile may be constructed for each user for each game. In other embodiments, the user profile may correspond to a particular user over multiple games, and comprise a first set of attributes for the user over all games associated with the user, and a second set of attributes for the user specific to particular games.

Difficulty Configuration System

Embodiments of the difficulty configuration system 132 can set or adjust the difficulty level of a video game 112. In some cases, the difficulty configuration system 132 may set or adjust the difficulty level of the video game 112 by providing or adjusting values for one or more of the gameplay parameters 114, which are then provided to the video game 112. In some cases, the difficulty configuration system 132 sets or adjusts every available gameplay parameter 114 each time a setting or an adjustment of a difficulty level is made. In other cases, the difficulty configuration system 132 may set or adjust a subset of available gameplay parameters 114 when setting or adjusting a difficulty level of the video game 112.

In some cases, the difficulty configuration system 132 may modify the difficulty of a portion of the video game 112 without constraints. In some other cases, the difficulty configuration system 132 may modify the difficulty of a portion of the video came 112 within a set of constraints. For example, the constraints may be specified by a developer, a set of rules, and/or are specific to portions of the video game 112. For example, in some cases, the difficulty configuration system 132 may adjust the difficulty level of a subsequent portion of the video game 112 based on a preceding portion of the video game 112 so that the change in difficulty does not exceed a difficulty threshold relative to the difficulty of the preceding portion. In some embodiments, the difficulty configuration system 132 may adjust the difficulty of portions of the video game 112 based upon historical data for the user (for example, from the user data repository 138). In some embodiments, the difficulty configuration system 132 may adjust the difficulty level by adjusting the values of one or more gameplay parameters, wherein the values of the gameplay parameters may be mapped to different difficulty levels using the gameplay parameter evaluation system 136 (described in greater detail below). The difficulty configuration system 132 may be configured to be turned off completely in some situations, such as during a tournament.

Model Generation System

Embodiments of the model generation system 146 can use one or more machine learning algorithms to generate one or more prediction models or parameter functions. One or more of these prediction models may be used to determine an expected value or occurrence based on a set of inputs, such as user interaction information, user attributes (for example, based upon the user's user profile), gameplay parameter values, and/or the like.

For example, a prediction model can be used to determine one or more metrics indicating a level of user engagement with the game. For example, the one or more metrics may comprise an expected churn rate or a probability that a user will cease playing the video game 112 based on one or more inputs to the prediction model, such as, for example, historical user interaction information for a user. In another embodiment, a prediction model can be used to determine a predicted level of challenge, or challenge level, that the user would prefer to face when playing the game, in order to increase the user's engagement with the game and probability that the user will play the game to completion. As another example, a prediction model can be used to determine an expected amount of money spent by the user on purchasing in-game items for the video game based on one or more inputs to the prediction model. In some cases, the prediction model may be termed a prediction model because, for example, the output may be or may be related to a prediction of an action or event, such as the prediction the user continues to play the video game 112.

In some embodiments, prediction models may be generated by analyzing data from a plurality of users or automated routines ("bots," discussed in greater detail below). The user or bot data may correspond to any type of user interaction information and/or bot information, such as length/frequency of user play sessions, user/bot scores, user/bot gameplay interactions, and/or the like. Relationships between different types of user and/or bot data can be identified to determine which types of user and/or bot data can be used to predict an expected value or occurrence. For example, certain types of user data may be found to be highly indicative of a level of user engagement (for example, frequency of user play sessions, user spend, and/or the like), while other types of user data may be found to be less indicative of level of user engagement. A number of different types of algorithms may be used by the model generation system 146. For example, certain embodiments herein may use a logistical regression algorithm. However, other algorithms are possible, such as a linear regression algorithm, a discrete choice algorithm, or a generalized linear algorithm, among others.

In some embodiments, the model generation system 146 may be implemented on a separate system from the interactive computing system 130. For example, one or prediction models 160 may be generated on a system separate from the interactive computing system 130, and received by the interactive computing system 130 for use by the interactive computing system 130 (for example, by engagement analysis system 140 and/or difficulty configuration system 132).

The machine learning algorithms can be configured to adaptively develop and update the models over time based on new input received by the model generation system 146. For example, the models can be regenerated on a periodic basis as new user information is available to help keep the predictions in the model more accurate as the user information evolves over time. The model generation system 146 is described in more detail herein. After a model is generated, it can be provided to the engagement analysis system 140.

Some non-limiting examples of machine learning algorithms that can be used to generate and update the parameter functions or prediction models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

Figure 1B:
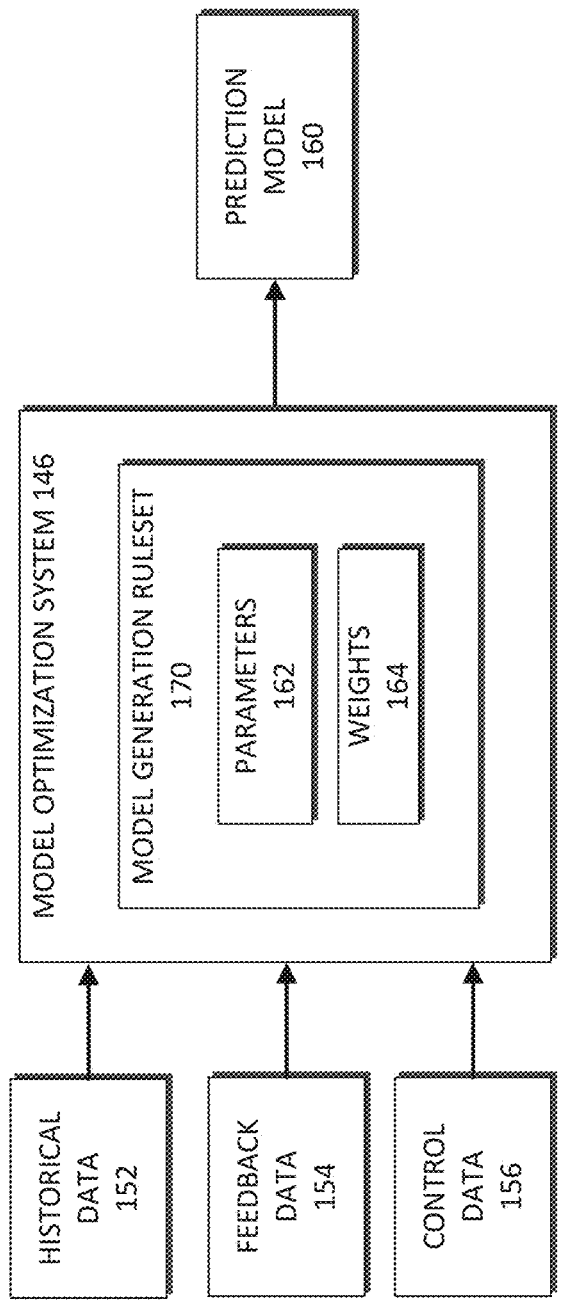
FIG. 1B illustrates an embodiment of a model generation system of FIG. 1A.

FIG. 1B illustrates an embodiment of the model generation system 146 of FIG. 1A. The model generation system 146 may be used to determine one or more prediction models 160 based on historical data 152 for a number of users. Typically, although not necessarily, the historical data 152 includes data associated with a large number of users, such as hundreds, thousands, hundreds of thousands, or more users. However, the present disclosure is not limited as such, and the number of users may include any number of users.

In some embodiments, the historical data 152 may comprise data for users that have played to game to completion, which may be used to determine the type of information (for example, users behaviors, gameplay settings, etc.) that may be most useful for predicting whether other users are likely to play the game until completion. In some embodiments, the historical data 152 may comprise data from one or more bots.

Further, the historical data 152 can include data received from one or more data sources, such as, for example, an application host system (not shown) and/or one or more user computing systems 102. Further, the historical data 152 can include data from different data sources, different data types, and any data generated by one or more user's interaction with the video game 112. In some embodiments, the historical data 152 may include a very large number of data points, such as millions of data points, which may be aggregated into one or more data sets. In some cases, the historical data 152 may be accessed from a user data repository 138. In some embodiments, the historical data 152 is limited to historical information about the video game, but in other embodiments, the historical data 152 may include information from one or more other video games. Further, in some embodiments, one or more subsets of the historical data a limited by a date criteria or other criteria, such as for example, limited to include only data from the last 6 months, or limited to users associated with a particular geographic region or time zone.

The model generation system 146 may, in some cases, also receive feedback data 154. This data may be received as part of a supervised model generation process that enables a user, such as an administrator, to provide additional input to the model generation system 146 that may be used to facilitate generation of the prediction model 160. For example, if an anomaly exists in the historical data 152, the user may tag the anomalous data enabling the model generation system 146 to handle the tagged data differently, such as applying a different weight to the data or excluding the data from the model generation process.

Further, the model generation system 146 may receive control data 156. This control data 156 may identify one or more features or characteristics for which the model generation system 146 is to determine a model. Further, in some cases, the control data 156 may indicate a value for the one or more features identified in the control data 156. For example, suppose the control data 156 indicates that a prediction model is to be generated using the historical data 152 to determine a length of time that the users played the video game 112. If the amount of time each user played the game is known, this data may be provided as part of the control data 156, or as part of the historical data 152. As another example, if the prediction model is to be generated to estimate a retention rate as determined, for example, based on whether the users played the video game 112 for a threshold period of time or continue to play the video game 112 after a particular threshold period of time, the control data 156 may include the retention rate for the users whose data is included in the historical data 152.

The model generation system 146 may generally include a model generation rule set 170 for generation of the prediction model 160. The rule set 170 may include one or more parameters 162. Each set of parameters 162 may be combined using one or more mathematical functions to obtain a parameter function. Further, one or more specific parameters may be weighted by the weights 164. In some cases, the parameter function may be obtained by combining a set of parameters with a respective set of weights 164. The prediction model 160 and/or the respective parameters 162 of the prediction models 160 may be derived during a training process based on particular input data, such as the historical data 152, feedback data 154, and control data 156, and defined output criteria, which may be included with the control data 156, used for training purposes. The model generation rule set 170 can define the specific machine learning rules and/or algorithms the model generation system 146 uses to generate the model based on a defined objective function, such as determining a retention rate. In some embodiments, initial parameters 162 and weights 164 can be manually provided during the initiation of the model generation process. The parameters 162 and weights 164 can be updated and modified during the model generation phase to generate the prediction model 160.

The model generation system 146 can filter and categorize the historical data sets according to various characteristics and parameters of the data. For example, the data can be categorized by the data source (such as, for example, game application data, host application data, or user profile data), information type (such as, for example, gameplay information, transaction information, interaction information, game account information), or other categories associated with the data. The model generation system 146 can filter the information to identify the information for further processing. In some embodiments, the model generation system 146 is configured to filter and separate the historical data 152 into a plurality of data types or categories before further processing. Moreover, in some cases, some of the historical data 152 may be filtered out or removed from the historical data 152 based on the data being associated with a relevance that does not satisfy a threshold relevance as determined by the model generation system 146.

After the prediction model 160 has been generated, the model can be used during runtime of the engagement analysis system 140 and/or the difficulty configuration system 132 to adjust the difficulty of the video game 112. In some cases, the adjustment of the difficulty may be dynamic and may occur during a user's interaction with the video game 112. Further, in some cases, the difficulty adjustment may occur in real-time or near real-time.

Engagement Analysis System

The engagement analysis system 140 can include one or more systems for determining a predicted churn or retention rate for a user based on the application of user interaction data for the user to a prediction model generated by the model generation system 140. In some cases, the difficulty configuration system 132 may use the predicted retention rate determined by the engagement analysis system 140 to determine an adjustment to the difficulty of the video game 112. In some embodiments the adjustments to the difficulty are determined using data in a mapping data repository 144 to determine which features of the game to change and how to change the features.

Figure 1C:
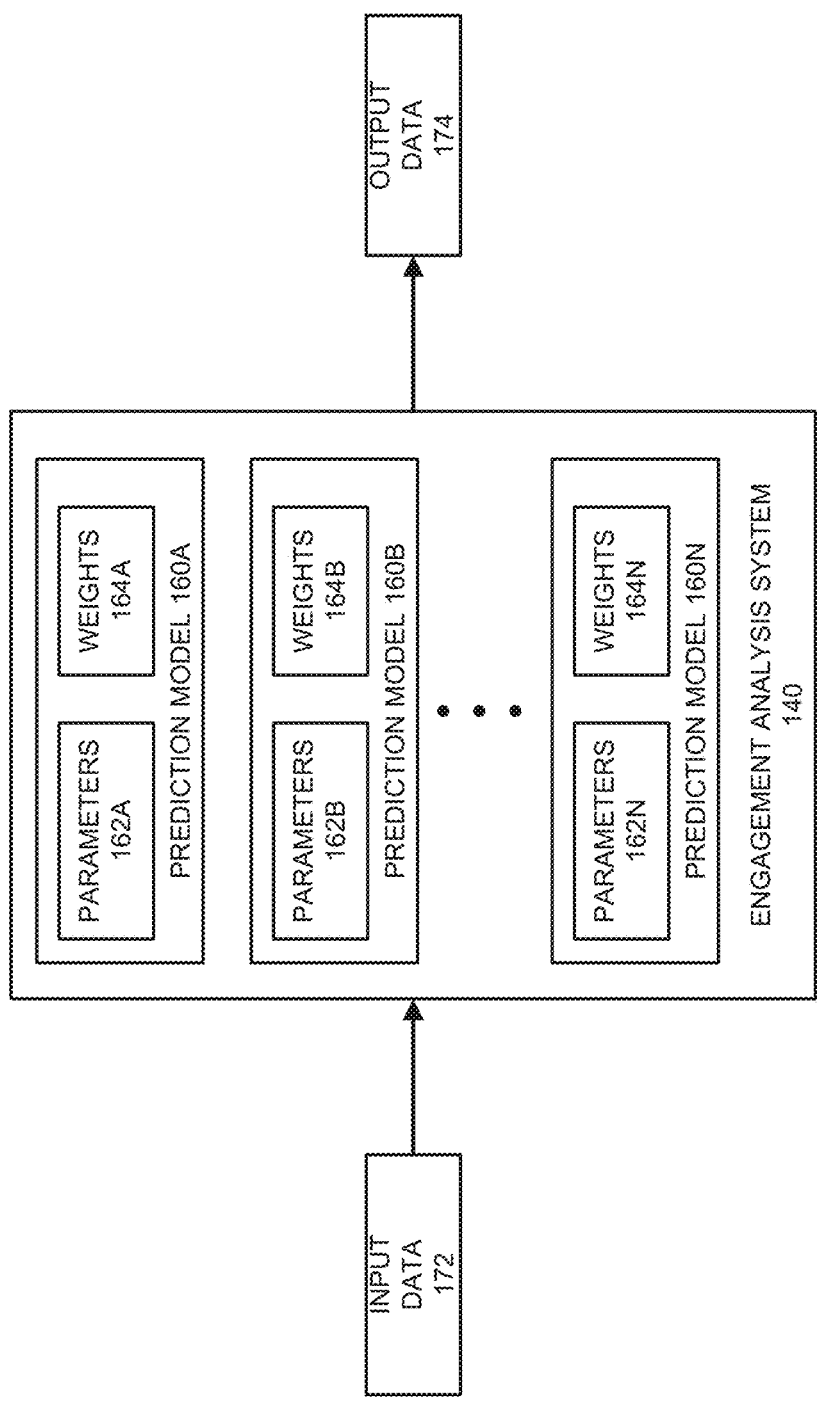
FIG. 1C illustrates an embodiment of an engagement analysis system of FIG. 1A.

FIG. 1C illustrates an embodiment of an engagement analysis system 140 of FIG. 1A. The engagement analysis system 140 can apply or use one or more of the prediction models 160 generated by the model generation system 146. Although illustrated as a separate system, in some cases, the engagement analysis system 140 may be included as part of the difficulty configuration system 132. The engagement analysis system 140 may use one or more prediction models 160A, 160B, 160N (which may be referred to collectively as "prediction models 160" or in the singular as "prediction model 160") to process the input data 172 to obtain the output data 174.

The engagement analysis system 140 may apply the prediction model(s) 160 during game play. In some embodiments, the prediction models 160 are applied at the beginning of the game to determine how to adjust the difficulty of the entire game. In other embodiments, the prediction models 160 are applied at different times during the game and/or at different stages in the game. During determination of a difficulty level for one or more portions of the video game 112, the engagement analysis system 140 receives input data 172 that can be applied to one or more of the prediction models 160. The input data 172 can include one or more pieces of data associated with a user who is playing the video game 112. This data may include user interaction data for the video game 112, profile data for the user, and any other data that may be applied to the prediction model 160 to determine a predicted level of challenge for the user, a retention or churn rate for the user, and/or the like. In some embodiments, the input data 172 can be filtered before it is provided to the engagement analysis system 140.

In some embodiments, a single prediction model 160 may exist for the engagement analysis system 140. However, as illustrated, it is possible for the engagement analysis system 140 to include multiple prediction models 160. The engagement analysis system 140 can determine which detection model, such as any of models 160A-N, to use based on input data 172 and/or additional identifiers associated with the input data 172. Additionally, the prediction model 160 selected may be selected based on the specific data provided as input data 172. The availability of particular types of data as part of the input data 172 can affect the selection of the prediction model 160. For example, the inclusion of demographic data (for example, age, gender, first language) as part of the input data may result in the use of prediction model 160A. However, if demographic data is not available for a particular user, then prediction model 160B may be used instead.

The output data 174 can be a predicted level of challenge, or challenge level, associated with a user at which the difficulty of the game is configured to increase user engagement with the video game so that a user continues to play the video game 112. The output data 174 can be configured to optimize for other parameters as well, such as a retention or churn rate. For example, in some embodiments, the output data 174 may comprise a predicted churn rate or predicted retention rate.

As used herein, the terms "predicted level of challenge" or "challenge level" may refer to a relative difficulty level of a video game that maintains a level of engagement of the user throughout the course of gameplay. In some embodiments, the predicted level of challenge may be expressed as a score between 0 and 100 indicating a level of difficulty of the game that will help to increase engagement for the user. In some embodiments, the predicted level of challenge may indicate a relationship between a difficulty level of the game and a skill level of the user. For example, a first user with a low level of skill and a second user with a high level of skill may both be associated with the same predicted level of challenge. However, the actual difficulty level for providing the predicted level of challenge to the first user may be lower than that for the second user.

In some embodiments, a retention rate may be between 0 and 100 indicating the predicted percentage of users that would cease to play the video game 112 within a threshold time period. In some cases, the output data 174 may also identify a reason for the retention rate. For example, the engagement analysis system 140 may indicate that the 90% retention rate for a particular user is based at least in part on the amount of money spent while playing the video game 112. However, the engagement analysis system 140 may indicate that the 80% retention rate for another user may be based at least in part on the below freezing temperature in the geographic region where the user is located. As another example, the engagement analysis system 140 may indicate that the 20% retention rate for a user may be based at least in part on the below 25% win ratio.

The prediction models 160A, 160B, 160N may generally include a set of one or more parameters 162A, 162B, 162N, respectively (which may be referred to collectively as "parameters 162"). Each set of parameters 162 (such as parameters 162A) may be combined using one or more mathematical functions to obtain a parameter function. Further, one or more specific parameters from the parameters 162A, 162B, 162N may be weighted by the weights 164A, 164B, 164N (which may be referred to collectively as "weights 164"). In some cases, the parameter function may be obtained by combining a set of parameters (such as the parameters 162A) with a respective set of weights 164 (such as the weights 164A).

Mapping Data Repository

The mapping data repository 144 can include one or more mappings between the output of a prediction model and a difficulty level of the video game 112, which may be used by, for example, the difficulty configuration system 132 to determine how to modify the video game 112 to adjust the difficulty of the video game 112. For example, if the user's predicted challenge level is "high," then the mapping data repository 144 may link a set of values for one or more gameplay parameters that make the game more difficult to play. In addition, the difficulty configuration system 132 may continue to adjust the game as the user continues to progress through the game, in order to maintain the predicted level of challenge. The mapping may be between the output of the parameter function and one or more values for one or more gameplay parameters or seeds that can be used to modify the difficulty of the video game 112.

Further, generation and application of the parameter functions and their use in adjusting the difficulty level of the video game 112 will be described in further detail below with respect to the engagement analysis system 140. In certain embodiments, the difficulty configuration system 132 may be or may include the model generation system 146. Moreover, in some cases, the difficulty configuration system 132 may be or may include the engagement analysis system 140.

User Grouping System

The user grouping system 134 can group or divide a set of users into groups based at least in part on information associated with each user, such as a user's skill level with respect to the video game 112 or other video games accessed by the user. The user grouping system 134 may group users based on one or more criteria associated with one or more of the users that impacts the users' engagement level with the video game 112 or other video games accessed by the users. In some embodiments, the user grouping system 134 may identify or determine a set of difficulty preferences to associate with each user group identified or generated by the user grouping system 134.

Gameplay Parameter Evaluation System

As discussed above, it may be desirable to be able to configure a difficulty level of the game based upon one or more outputs of the engagement analysis system 140. In some embodiments, the difficulty level of a game can be configured by setting values for one or more gameplay parameters. However, in order to be able to adjust a difficulty level of the game by adjusting gameplay parameter values, it may be necessary to be able to associate different gameplay parameter values with difficulty levels.

The gameplay evaluation system 136 can evaluate a difficulty or a challenge provided by the video game 112 of gameplay parameter values, such as seed values and/or other adjustable aspects or parameters that can affect execution of the video game (for example, a difficulty of the gameplay of the video game). For example, the gameplay evaluation system 136 can determine how challenging a particular level or portion of the video game (such as a dungeon) based on how well users do playing the video game 112 when particular parameter values and/or seed values are utilized. Advantageously, in certain embodiments, by evaluating the challenge provided by a particular gameplay parameter value, range or gameplay parameter values, and/or combination of a plurality gameplay values, the difficulty level of the video game 112 can be refined by adjusting the gameplay parameter values for a particular difficulty level. For example, if it is determined that a specific gameplay parameter value, range of values, and/or combination of a plurality gameplay values causes users to fail at a higher rate (for example, 80%), the gameplay parameter value(s) may be associated with the harder difficulty level than other settings for the gameplay parameter value(s) that causes users to fail at a lower rate (for example, 20%).

In some embodiments, the gameplay parameter may correspond to a seed value. For example, in some embodiments a level of a game may be generated based upon a chosen seed value. Different seed values may be associated with different levels or categories of difficulty. In some embodiments, an initial difficulty level of a given seed may be unknown. However, as gameplay data, such as data associated with a group of users playing the video game 112, is received, the difficulty level of the seed may be inferred based upon how successful users are at succeeding at levels of the video game generated using the seed.

In some embodiments, the level of difficulty associated with certain gameplay parameter values (for example, seed values) may be evaluated by using data associated with one or more automated agents (as opposed to human users) for simulating gameplay. One or more automated agents (also referred to as "bots") may be used to attempt to play through gameplay states of a level generated using a particular gameplay parameter value (such as a specific seed value) based on a defined routine associated with the agent. In some embodiments, different bots may be associated with different types of routines corresponding to different types of gameplay behaviors. For example, a first type of bot may be programmed to simulate taking random actions during the course of gameplay, while a second type of bot may be programmed to prioritize taking certain types of gameplay actions over others. In some embodiments, different types of bot may be associated with different skill levels. Running a plurality of different types of bots a plurality of different times on gameplay levels based upon the gameplay parameter, can help to determine a difficulty level associated with the gameplay parameter.

For example, in some embodiments, many different bots with different skill levels (for example, different behavioral routines) may be run on a portion of a video game having particular gameplay parameter values, in order to assess a difficulty level or other attribute of the portion of the video game or a difficult associated with the gameplay parameter values. Metrics such as bot skill level, number of moves or resources used by bot to complete the portion of the game, time by bot to complete the portion of the game, success rate or number of attempts by bot to complete the portion of the game, score achieved by bot when playing the portion of the game, and/or the like, may be recorded and used to assess a difficulty level or other attribute associated with the portion of the game or of one or more gameplay parameter values associated with the portion of the game. In some embodiments, the recorded metrics may be used to generate or modify a predictive model 160, such as for assessing a skill level of a user.

Network

The network 104 can include any type of communication network. For example, the network 104 can include one or more of a wide area network (WAN), a local area network (LAN), a cellular network, an ad hoc network, a satellite network, a wired network, a wireless network, and so forth. Further, in some cases, the network 104 can include the Internet.

Example Machine Learning Process

Figure 2:
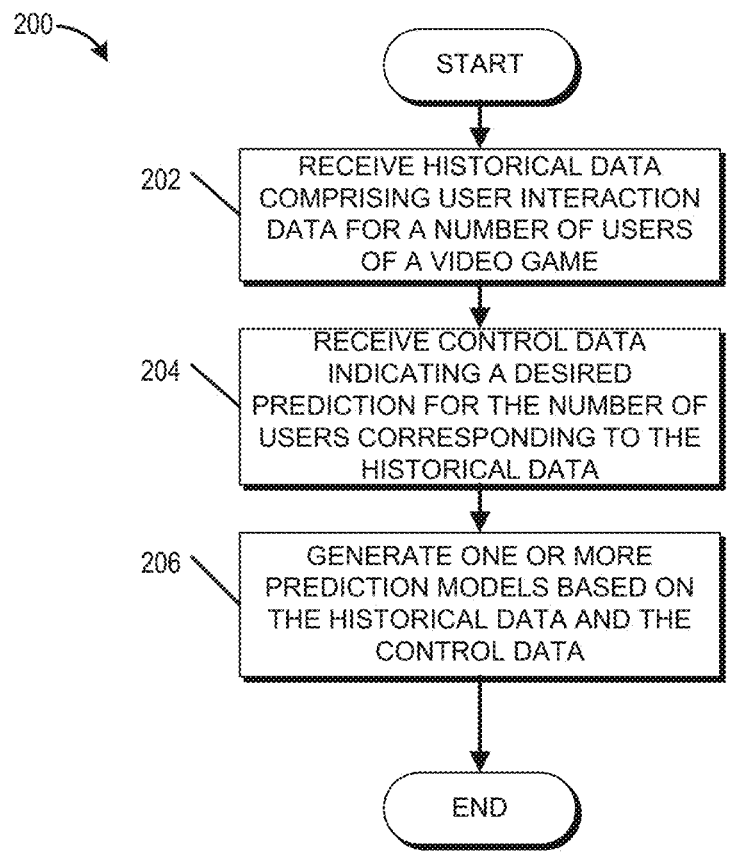
FIG. 2 presents a flowchart of an embodiment of a machine learning process.

FIG. 2 presents a flowchart of an embodiment of a machine learning process 200. The process 200 can be implemented by any system that can generate one or more parameter functions or prediction models that include one or more parameters. In some cases, the process 200 serves as a training process for developing one or more parameter functions or prediction models based on historical data or other known data. The process 200, in whole or in part, can be implemented by, for example, an interactive computing system 130, a difficulty configuration system 132, a user grouping system 134, an engagement analysis system 140, a model generation system 146, or a user computing system 110, among others. Although any number of systems, in whole or in part, can implement the process 200, to simplify discussion, the process 200 will be described with respect to particular systems. Further, it should be understood that the process 200 may be updated or performed repeatedly over time. For example, the process 200 may be repeated once per month, with the addition or release of a new video game, or with the addition of a threshold number of new users available for analysis or playing a video game 112. However, the process 200 may be performed more or less frequently.

The process 200 begins at block 202 where the model generation system 146 receives historical data 152 comprising user interaction data for a number of users of the video game 112. This historical data 152 may serve as training data for the model generation system 146 and may include user demographics or characteristics, such as age, geographic location, gender, or socioeconomic class. Alternatively, or in addition, the historical data 152 may include information relating to a play style of one or more users; the amount of money spent playing the video game 112; user success or failure information with respect to the video game 112 (for example, a user win ratio); a play frequency of playing the video game 112; a frequency of using particular optional game elements (for example, available boosts, level skips, in-game hints, power ups, and the like); the amount of real money (for example, U.S. dollars or European euros) spent purchasing in-game items for the video game 112; and the like. Further, in some cases, the historical data 152 may include data related to the video game 112, such as one or more seed values used by users or bots who played the video game 112. Additional examples of data related to the video game 112 that may be received as part of the historical data 152 may include settings for one or more gameplay parameters or state variables of the video game 112, the identity of one or more difficulty levels for the video game 112 used by the users, the type of the video game 112, and the like.

In some embodiments, the historical data 152 may also comprise data associated with one or more automated routines or bots. For example, the historical data 152 may serve as training data for the model generation system 146 and may include bot types or characteristics (for example, bot skill level, rules or routines related to the bot), gameplay parameter values used when evaluating bot gameplay, bot gameplay data (for example, bot success/failure rate at completing portions of the video game, number of steps, moves, or other in-game resources used by bot in playing a portion of the video game, and/or the like).

At block 204, the model generation system 146 receives control data 156 indicating known output for a number of users based on the provided historical data. This control data 156 may indicate one or more features or characteristics for which the model generation system 146 is to use to generate a model. Alternatively, or in addition, the control data 156 may include a value for the features or characteristics that are associated with the received historical data 152. For example, the control data 156 may identify difficulty level, churn rate, or retention rate, as the desired feature to be predicted by the model that is to be generated by the model generation system 146. The difficulty level may correspond to a difficulty level of the game that will increase an engagement level of the user. The churn rate or retention rate may correspond to a percentage of users associated with the historical data 152 that ceased playing the video game 112. Further, the control data 156 may identify a difficulty level and/or retention rate associated with the historical data. For example, the control data 156 may indicate a high level of difficulty is desirable for certain users whose data is included in the historical data 152. In another example, the control data 156 may indicate that the retention rate is 60% for certain users whose data is included in the historical data 152. In some embodiments, the control data 156 may include multiple characteristics or features to be predicted by the model to be generated by the model generation system 146. For example, the control data 156 may identify both a retention rate and a reason for the retention rate (such as the difficulty of the video game 112 being too low or too high for the users whose data was provided as part of the historical data 152 at block 202), or a retention rate and an average monetary amount spent by the users whose data was provided as the historical data 152.

At block 206, the model generation system 146 generates one or more prediction models 160 based on the historical data 152 and/or the control data 156. The prediction models 160 may include one or more variables or parameters 162 that can be combined using a mathematical algorithm or model generation ruleset 170 to generate a prediction model 160 based on the historical data 152 and, in some cases, the control data 156.

In some embodiments, the historical data 152 may be analyzed to determine which types of information related to a user exhibit correlations with values of a desired prediction, in order to determine which types of information are most useful for determining a prediction for a user. For example, in some embodiments, information associated with users who have played a game to completion may be analyzed to determine which types of information (for example, users behaviors, gameplay settings, etc.) may be most useful for predicting whether other users are likely to play the game until completion.

Further, in certain embodiments, the block 206 may include applying one or more feedback data 154. For example, if the prediction model 160 is generated as part of a supervised machine learning process, a user (for example, an administrator) may provide one or more inputs to the model generation system 146 as the prediction model 160 is being generated and/or to refine the prediction model 160 generation process. For example, the user may be aware that a particular region or geographic area had a power outage. In such a case, the user may supply feedback data 154 to reduce the weight of a portion of the historical data 152 that may correspond to users from the affected geographic region during the power outage. Further, in some cases, one or more of the variables or parameters may be weighted using, for example, weights 164. The value of the weight for a variable may be based at least in part on the impact the variable has in generating the prediction model 160 that satisfies, or satisfies within a threshold discrepancy, the control data 156 and/or the historical data 152. In some cases, the combination of the variables and weights may be used to generate a prediction model 160.

Example Dynamic Difficulty Adjustment System Interactions

Figure 3:
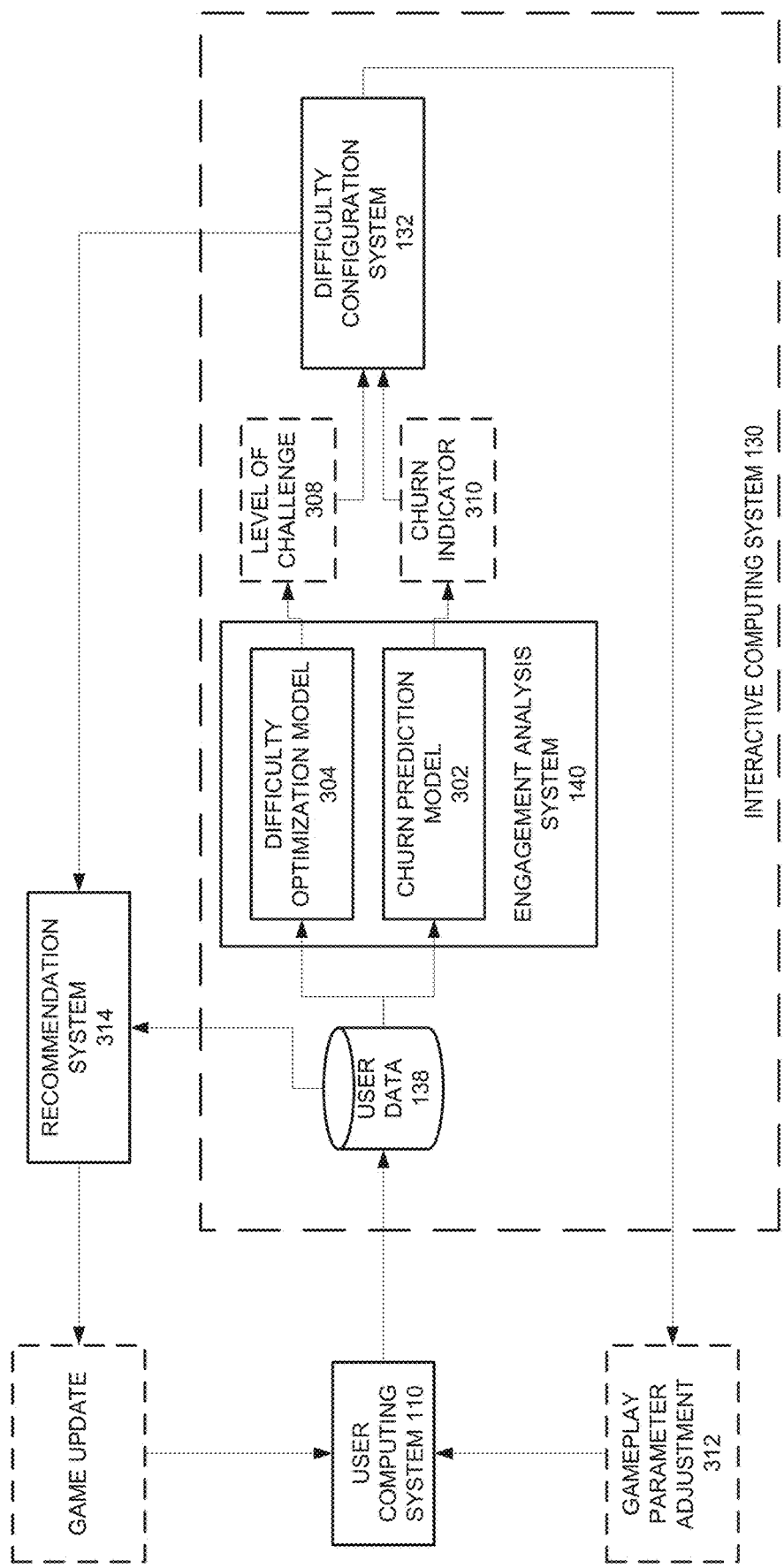
FIG. 3 illustrates an embodiment of a block diagram of a system for implementing dynamic difficulty.

FIG. 3 illustrates a block diagram of interactions between the user computing system 110, engagement analysis system 140, and difficulty configuration system 132, in accordance with some embodiments. As discussed above, a user may play a video game at a user computing system 110. For example, the video game may correspond to the video game 112 as illustrated in FIG. 1A.

As the user at the user computing system 110 plays the video game 112, user data may be generated and stored in the user data repository 138 of the interactive computing system 130. The user data may comprise information pertaining to an identity of the user, such as a user id, user profile information, user demographic information, and/or the like. In addition, the user data may comprise indications of user actions performed during the course of gameplay, game states reached by the user during the course of gameplay, levels of gameplay completed by the user, and/or other gameplay statistics (for example, scores, win/loss records, attempts at completing certain actions or levels, and/or the like).

In some embodiments, the user data may be collected and stored in the user data repository 138 in substantially real-time as the user plays the video game 112. In other embodiments, the user data may be stored in a storage associated with the user computing system 110 (for example, the user interaction history 116), and only transmitted and stored to the user data repository 138 at defined intervals (for example, at the end of a play session, at designated times during a play session, and/or the like).

The user data repository 138 may comprise player data collected over a plurality of play sessions for a plurality of different users. For example, in some embodiments, the first time a user plays the video game 112, account information or other identifying information may be collected for the user. User data may be collected for the user each time the user plays the game. As such, the user data repository 138 may comprise aggregated historical data for a plurality of users of the game (for example, historical data 152).

In some embodiments, the user data repository 138 may further comprise data from one or more automated agents running defined routines ("bots") (not shown). Each bot may be used to simulate gameplay by stepping through a plurality of gameplay states of the video game 112. In some embodiments, different bots may be associated with different rules or procedures for stepping through the gameplay states of the video game 112 of a particular portion of the video game 112. In some embodiments, bots may be configured to step through gameplay states of particular portions of the video game 112 associated certain gameplay parameter values, in order to evaluate a difficulty level associated with the gameplay parameter values.

In some embodiments, as discussed above, user data for a particular user stored in the user data repository 138 may be used to construct a user profile that aggregates data associated with the user. For example, the user profile may define one or more attributes of the user by aggregating collected user data. Attributes may correspond to any type of value indicating an aspect of the user's behavior with regards to the video game 112, such as a determined skill level of the user, a total length of time the user has played the game, average session time, high score, average score, kills/deaths, average attempts per level, highest number of attempts for a level, and/or the like. In some embodiments, a user profile may be constructed for each user for each game. In other embodiments, the user profile may correspond to a particular user over multiple games, and comprise a first set of attributes for the user over all games associated with the user, and a second set of attributes for the user specific to particular games.

In some embodiments, the user profile attributes may correspond to historical data 152 used by the model generation system 146 to construct one or more prediction models 160 to historical data 152 as illustrated in FIG. 1B. For example, as discussed above, the model generation system 146 may analyze attributes of a plurality of different user profiles in order to determine which user attributes are most relevant in predicting one or more types of output data 174, for generating a prediction model 160. In some embodiments, the user profile attributes may be used as input data 172 for a prediction model 160 as illustrated in FIG. 1C. For example, the prediction model 160 may receive the user profile attributes and use them to generate a prediction (for example, an expected churn rate, a predicted level of challenge, and/or the like).

In some embodiments, data of the user data repository 138 (for example, the user profile for a particular user) may be used by one or more prediction models 160 of the engagement analysis system 140 to generate one or more predictions. The prediction models 160 may comprise a churn predictor 302 used to calculate a retention or churn indicator 310 for a user, indicating a likelihood that the user will stop playing the game, and a difficulty optimization model 304.

The difficulty optimization model 304 may be configured determine a level of challenge 308 for the user playing the game. For example, different types of users may prefer to play games that are more or less difficult. A first type of user may prefer to play easier games, and may become frustrated with a game and cease playing if they are unable to accomplish objectives within the game within a certain number of attempts. On the other hand, a second type of user may enjoy being challenged by a game, and may derive increased enjoyment from the game if the user is unable to complete certain objectives in the game on their first try. In some embodiments, the predicted level of challenge for a user 308 may be indicated using an optimal win rate for the user at various states within the game. For example, higher win rates for the user at a particular state in the game may indicate a low level of challenge, while lower win rates for the user at the state may indicate a lower level of challenge.

The difficulty optimization model 304 may use the data from the user profile to determine an expected behavior of the user. For example, if it is known that the user has attempted a particular level in a game a certain number of times and yet has continued playing the game, the difficulty optimization model 304 may predict that the user is able to accept a certain degree of challenge 308 when playing the game. The user's user profile data may be compared with historical data associated with other users, in order to assess how the user may be expected to behave.

In some embodiments, a user may be associated with a user pool or group comprising a plurality of users having similar attribute values (such as, for example, similar skill levels, similar gameplay behavior, similar amount of spend on the game, and/or the like), wherein the level of challenge 308 for the user may be determined based upon a level of challenge associated with the group. In some embodiments, users may be grouped using the user grouping system 134, based upon attribute values specified by the difficulty optimization model 304.

In some embodiments, the difficulty optimization model 304 may determine a difficulty trajectory for the user. For example, as a user progresses through a game, it may often be expected that the game will become more difficult or more complex. On the other hand, it may also be expected the user playing the game will increase in skill and/or gain a better understanding of the game as they progress through the game. As such, by altering difficulty of the game based upon a difficulty trajectory, it may be possible for a level of challenge 308 presented to the user when playing the game to be kept at a desirable level. For example, the difficulty trajectory may be configured such that the difficulty level of the game increases based upon an expected rate of increase of the user's skill level, such that the level of challenge 308 presented to the user over the course of gameplay may remain at a desirable level (for example, relatively constant, or slowly increasing as the game progresses). The difficulty trajectory may be used to determine a current difficulty faced by the user in the video game 112, as well as control a rate at which difficulty of the video game 112 may increase or decrease as the game progresses, by altering one or more gameplay parameters 114 associated with the game.

In some embodiments, the difficulty configuration system 132 may use the output of one or more prediction models to dynamically determine a gameplay parameter adjustment 312 to adjust a difficulty level of the video game 112 for the user. For example, a difficulty of the game may be changed, based upon a predicted churn indicator 310 (from the churn prediction model 302) or a predicted level of challenge 308 or difficulty trajectory (from the difficulty optimization model 304). In some embodiments, the difficulty configuration system 132 may use the mapping data repository 144 to map a predicted challenge level output by the difficulty optimization model 310 with a difficulty level or a gameplay parameter value. For example, based upon a skill level of the user, the predicted level of challenge 308 may be used to determine a difficulty level for the user at their current state in the game. The difficulty level may be used to select a particular gameplay parameter value (for example, a seed value) that is associated with the desired difficulty level.

In some embodiments, the difficulty configuration system 132 may specify a gameplay parameter adjustment 312 based upon an output of the churn prediction model 302. For example, if the churn prediction model 302 indicates that the user is likely to turn (for example, the churn indicator 310 meets a threshold value), the difficulty configuration system 132 may specify a gameplay parameter adjustment 312 configured to lower a difficulty level in order to discourage the user from churning in the short term (for example, to allow the user to advance to a next level in the game).

On the other hand, the dynamic adjustment 312 based upon the difficulty optimization model 304 may result in more long-term effects on gameplay for the user, for example, by raising or lowering the difficulty trajectory for the user, based upon the user's level of challenge 308 as determined by the difficulty optimization model 304. For example, if it is determined that the user is progressing through the game quickly (for example, number of attempts per level is low) but appears to be losing interest in the game (for example, length or frequency of game sessions is decreasing), the difficulty optimization model 304 may predict a level of challenge 308 higher than the current level of challenge being faced by the user. In response, the difficulty configuration system 132 may specify a gameplay parameter adjustment 312 to raise the difficulty trajectory of the game, in order to present the user with more of a challenge.

As the user continues to play the game, the difficulty optimization model 304 may adjust the level of challenge 308 or the difficulty trajectory for the user as additional user data for the user is received. For example, received user data may indicate that the user is experiencing more challenge than normal at a particular part of the game. This may indicate that the skill of the user has not improved as expected relative to the difficulty trajectory of the game, or that the particular part of the game is more difficult than expected. As such, the difficulty trajectory may be adjusted based upon the received user data. For example, if it is determined that the user's increase in skill has not kept up with the difficulty trajectory of the game, the difficulty trajectory may be lowered in order to maintain the predicted level of challenge associated with the user.

In some embodiments, the difficulty configuration system 132 may also generate reports, data sets, flags, indicators, or feedback for a game developer to review to consider adjusting one or more aspects of the game. For example, a recommendation system 314 may analyze game difficulty settings as determined by the difficulty configuration system 132 for a plurality of users, as well as user data from the user data repository 138 associated with the plurality of users, in order to determine whether certain portions of the game are more or less difficult than intended. For example, in response to a detection that a large number of users are using more or less attempts than would be expected at a certain portion of the game, are churning at a portion the game, and/or the like, it may be determined that the portion of the game is more or less difficult than expected. As such, the recommendation system 314 may generate a report or recommendation to be presented to game developer indicating that a difficulty level of a portion of the game is not as expected. In some embodiments, the recommendation may specify one or more gameplay parameters associated with the portion of the game. The game developer, upon viewing the recommendation, may then decide to adjust the difficult level of the portion of the game by creating a game update 316 addressing the detected problem to update the game at the video game 112.

Example Player Progression Model

Figure 4A:
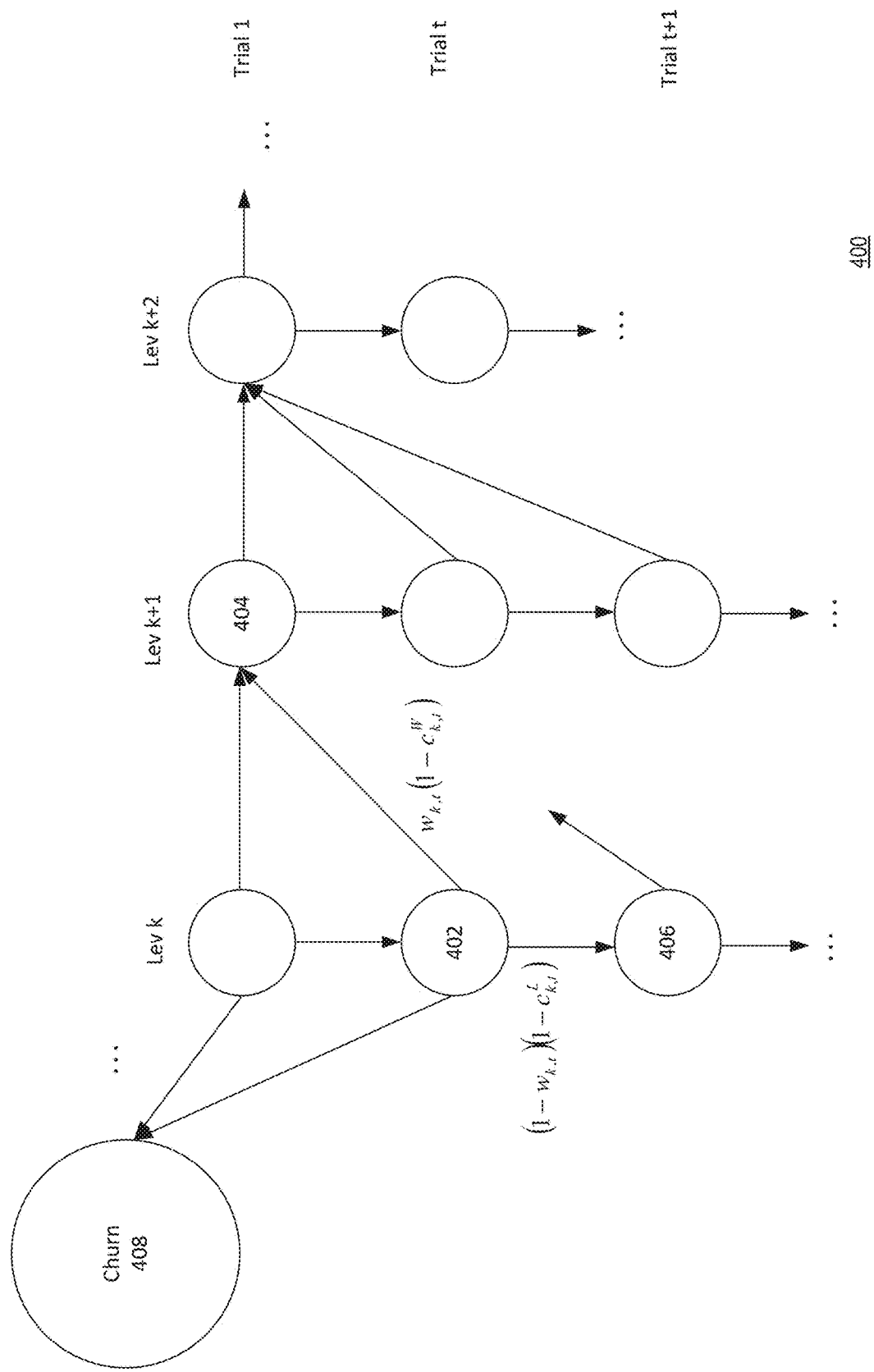
FIG. 4A illustrates an example of a player progression model in a level-based game, in accordance with some embodiments.

In some embodiments, how a user progresses through a game may be modeled using a player progression model. FIG. 4A illustrates an example of a player progression model 400 in a level-based game. In some embodiments, in a level-based game, a user may unlock and advance to higher levels only if the player wins or completes the current level. As such, the user's progression within the game may be measured by the level of the game that they are currently at. While the model 400 illustrated in FIG. 4A may refer primarily to progression in level-based games, it is understood that the model may be generalized other game types as well. In some embodiments, the model 400 illustrated in FIG. 4A may be implemented as part of the difficulty optimization model 304 as illustrated in FIG. 3.

As illustrated in FIG. 4A, a current progression state of a user may be defined using two dimensions: level and trial (indicating a number of attempts made by the player at winning a particular level). For example, when a user is at a particular level (e.g., level k) and having made a particular number of trials at the level (e.g., trial t), the user can either advance to a higher level (e.g., level k+1) or remain at the current level with repeated trials (e.g., trial t+1). The state of the user playing the game at the k-th level at the t-th trial may be denoted as $s_{k,t}$.

FIG. 4A illustrates an example of possible progressions of the user between different states. For example, when the user at an initial state $s_{k,t}$ 402 completes the level k, they may advance to a first trial state of the next level (state $s_{k+1,1}$ 404). However, if the user fails to complete the level, they may move to a next trial state of the same level (state $s_{k,t+1}$ 406). In addition, a churn state 408 may exist where a user ceases playing the game and never returns to the game. The user may enter the churn state from any other state.

In some embodiments, state transitions in a user's player progression model may be modeled based upon a win rate $w_{k,t}$ (indicating a probability at which a user may complete a current level k at a trial t to be able to advance to a next level) and a churn rate $c_{k,t}$ (indicating a probably at which a user may churn at a given level k and trial t). In some embodiments, churn rate $c_{k,t}^L$ may comprise a win churn rate $c_{k,t}^W$ (indicating a probability that the user will churn after successfully completing the level k on a trial t) and a loss churn rate $c_{k,t}^L$ (indicating a probability that the user will churn after an unsuccessful attempt at completing the level k on a trial t). In some embodiments, the win rate $w_{k,t}$ may be indicative of a level of challenge experienced by the user at level k and trial t of the game (for example, a high win rate indicating that the level of challenge for the user is low, and a low win rate indicating that the level of challenge for the user is high).

As such, the probability that the user will progress to a next level state 404 (for example, if they successfully complete a level of the game and do not churn) may be expressed as:

$$Pr(s_{k+1,1}|s_{k,t}) = w_{k,t}(1 - c_{k,t}^W)$$

On the other hand, the probability that the user will retry a current level after an unsuccessful attempt at completing the level ((state 406) may be expressed as:

$$Pr(s_{k,t+1}|s_{k,t}) = (1 - w_{k,t})(1 - c_{k,t}^L)$$

The probability that the user will reach the churn state 408, after either successfully completing a level or an unsuccessful attempt at completing the level, may be expressed as:

$$Pr(\text{churn}|s_{k,t}) = w_{k,t} c_{k,t}^W + (1 - w_{k,t}) c_{k,t}^L$$

In some embodiments, dynamic difficulty adjustment may be used to configure the values of win rates $w_{k,t}$ in order to increase user engagement and minimize the probability of user s entering the churn state.

As discussed above, a user's engagement may be measured using a variety of different metrics, such as amount of time played, length, and frequency of game sessions, and/or the like. In some embodiments, user engagement may be measured by a number of rounds played by the user, wherein each round may refer to an attempt by the user (successful or unsuccessful) to complete a level. The higher the number of rounds a user may be expected to play over the course of the entire game, the higher their engagement level and the less likely they are to churn.

In some embodiments, a metric R may be used to express a number of rounds a user may be expected to play over the course of the entire game. The metric $R_{k,t}$ may be used to express an expected total number of rounds played after the user has reached a particular state $s_{k,t}$. As illustrated in FIG. 4A, for a given state $s_{k,t}$, a user may only be able to transition to two other non-churn states, $s_{k+1,t}$ (if the user successfully completes the level k) and $s_{k,t}$ (if the user is unsuccessful in completing the level k). As such, $R_{k,t}$ can be computed as a weighted sum of $R_{k+1,t}$ and $R_{k,t+1}$, based on the transition probabilities between the states. For example, $R_{k,t}$ may be expressed as:

$$R_{k,t} = Pr(s_{k+1,t}|s_{k,t}) \cdot R_{k+1,t} + Pr(s_{k,t+1}|s_{k,t}) \cdot R_{k,t+1} + 1$$

Using the above equations for $Pr(s_{k+1,t}|s_{k,t})$ and $Pr(s_{k,t+1}|s_{k,t})$, $R_{k,t}$ may be expressed as a function of win rate w and churn rate c as follows:

$$R_{k,t} = w_{k,t}(1 - c_{k,t}^W) \cdot R_{k+1,t} + (1 - w_{k,t})(1 - c_{k,t}^L) \cdot R_{k,t+1} + 1$$

A set of optimal win rates across a plurality of states may be determined in order to maximize user engagement and decrease churn throughout the course of the entire game. For example, the set of optimal win rates may be calculated as:

$$W = \underset{W}{\mathrm{argmax}}\, R_{1,1}(W)$$

wherein W corresponds to a set of win rates $\{w_{k,t}\}$ for a plurality of different states. In some embodiments, each $w_{k,t}$ may be constrained between upper and lower bounds, based upon one or more game design or content constraints (for example, $w_{k,t} \in [w_{k,t}^{low}, w_{k,t}^{up}]$).

By determining an optimal win rate $w_{k,t}$ for a particular user at each game progression state, the engagement of the user (for example, as indicated by the expected number of rounds to be played $R_{k,t}$) may be improved, making the user less likely to churn for the course of playing the game. In some embodiments, an expected churn rate for the user at different states may be determined by comparing the user to other similar users who have played the game. For example, as discussed above, a user may be associated with other users or users groups based upon shared characteristics, which may include personal or demographic characteristics, as well as gameplay characteristics such as length and frequency of play sessions, number of trials for particular levels, user skill level, and/or the like. Historical churn rates for different types of users at different gameplay states may be tracked and maintained, allowing for a predicted churn rate to be determined for individual users. As the user continues to progress through the game, their predicted churn rate for different states of the user may be adjusted, based upon one or more monitored gameplay characteristics for the user.

In some embodiments, the difficulty optimization model 304 may determine an initial set of baseline win rates or difficulty levels for a user playing the game. The win rates or difficulty level for the user may then be updated as additional user information is obtained and the user is able to be compared and associated with other users or user groups. In some embodiments, the baseline win rates or difficulty levels may be determined based upon aggregated data for all users who have played the game, while the updated win rates or difficulty levels may be personalized for the particular user based upon their individual player history.

Example Difficulty Trajectories

As described above, an optimal win rate indicative of a level of challenge for the user may be determined for various gameplay states. As the user progresses through the game, the level of challenge for the user and the user's skill level may be used to determine a difficulty trajectory for the user.

FIG. 4B illustrates a graph 410 showing examples of difficulty trajectories that may be configured for a game, in accordance with some embodiments. As discussed above, in some embodiments, the difficult trajectory for a user of the game may be configured using the difficulty optimization model 310 and/or the difficulty configuration system 132 or other prediction model 160. As illustrated in FIG. 4B, graph 410 may indicate a difficulty level on the y-axis against a level of game progression on the x-axis. As discussed above, the level of game progression may be indicated by one or more factors relating to the user, such as a level in the game reached by a user, a player level of the user, a total time played by the user, a number of rounds or matches played by the user, and/or the like. In some embodiments, how game progression may be measured may be determined based upon a type of game. For example, some games may be divided into discrete gameplay levels (e.g., level-based games). On the other hand, some games may not have discrete gameplay levels, but may instead track a player level as the player progresses through the game.

In some embodiments, a game may have an initial period of gameplay 412 (for example, number of levels, time, and/or the like) where difficulty is low. This may be used to teach a user the mechanics of the game (for example, a tutorial). In some embodiments, this initial period (also referred to as a "tutorial period") may be configured to have the same difficulty for all users (e.g., a low difficulty level such that a win rate for all users may be close to 100%). In some embodiments, although no difficulty adjustment is performed during the tutorial period, user data (for example, comprising user interactions with the video game) may be collected for the user as the user progresses through the tutorial period.

At a point after the tutorial period 412, the difficulty of the game may begin to increase, in order to provide the user with more of a challenge. As user data is acquired for the user and used to update the user profile and the attributes of the user, the user may be associated with a particular difficulty trajectory (for example, trajectories 414A, 414B, 414C). In some embodiments, the attributes of the user may be compared with those of other users who have played the game, in order to identify a difficulty trajectory that is expected to provide a predicted level of challenge to the user. In some embodiments, the predicted level of challenge may correspond to an optimal win rate calculated for the user to maximize an engagement level of the user throughout the course of the game.

In some embodiments, as the user continues playing the game, the collected data for the user may indicate changes in the user behavior. For example, it may be determined that the user's level of engagement has lowered (for example, based upon length of play sessions, frequency of play sessions, and/or the like), while the user is currently making fewer attempts in order to progress through each level (for example, indicating an increasing win rate for the user). As such, it may be inferred that the level of challenge being faced by the user is insufficient for keeping the user engaged, and the difficulty trajectory associated with the user may be adjusted accordingly (for example, from trajectory 414B to trajectory 414A). In some embodiments, the difficulty trajectory of the user may be adjusted in substantially real-time. In other embodiments, the difficulty trajectory of the user may be adjusted at certain points in time (for example, at the beginning or end of a play session, between levels of gameplay, and/or the like).

Difficulty Adjustment Cycle

Figure 5:
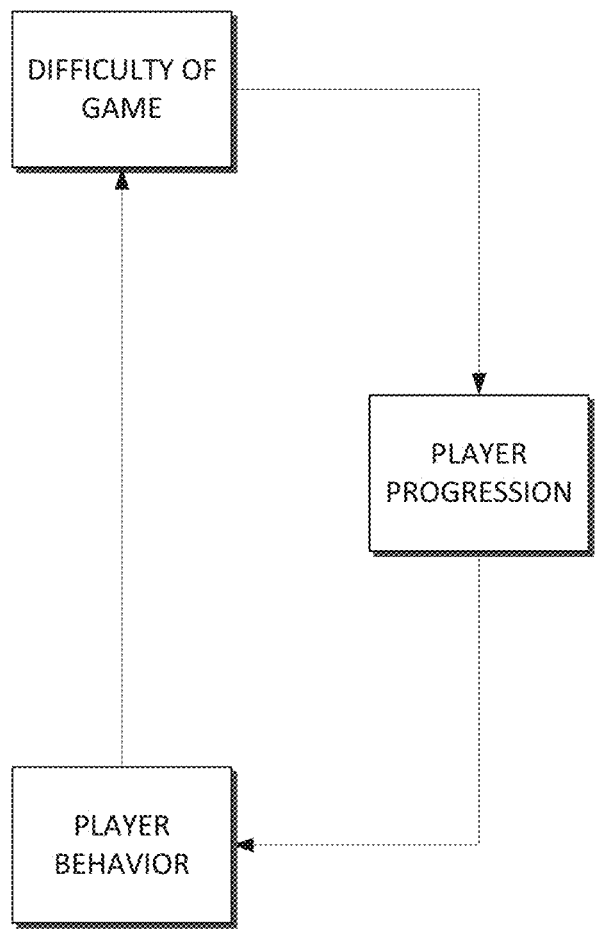
FIG. 5 illustrates a diagram of how game difficulty, player progression, and player behavior may interact, in accordance with some embodiments.

FIG. 5 illustrates a diagram of difficulty adjustment cycle showing how game difficulty, player progression, and player behavior may interact, in accordance with some embodiments. A level of difficulty of the game may affect the ability of a player to progress through the game. Indicators of player progression, such as player score, levels completed by the player, player win/loss record, and/or the like may be influenced by how difficult a game is to play. For example, when a game is easier, a player may be able to complete a level of the game after only a small number of attempts or by expending only a small amount of in-game resources (for example, hit points, gold, and/or the like). On the other hand, if the game is more difficult, a player may make many attempts before being able to complete a level of the game, or may have to expend a larger amount of in-game resources. In some embodiments, the player's progression through the game may be directly measured through the collection of user data as the user plays the game.

A player's progression through the game may affect the player's behavior regarding the game. Different players may react differently to their ability to progress through a game. For example, a player who prefers to be challenged when playing a game may experience an increased level of engagement when they are unable to progress quickly through a game, while experiencing a diminished level of engagement when they are able to progress too quickly through the game. On the other hand, other types of players may experience the opposite effect. In some embodiments, aspects of player behavior (for example, level of engagement) may be measured through the collection of user data, such as frequency and duration of player sessions, indicating a player's level of engagement with a particular game. For example, a player whose play sessions trend shorter or less frequent over time may be determined as experiencing a low level of engagement, while a player having consistent play sessions or play sessions of increasing frequency or duration may be determined as experiencing a high level of engagement.

As described above, the difficulty of the game can be configured based upon collected user data indicative of user behavior (for example, using the difficulty optimization model 304). By identifying how the behavior of a particular user may be influenced by the user's player progression through the game, the difficulty level of the game may be configured to in order to allow the user to progress through the game at a way that maximizes the user's level of engagement with the game. For example, the difficulty level may be optimized in order to achieve an optimal win rate for the user at a particular state in the game. In some embodiments, the difficulty level may be determined based upon the optimal win rate and a skill level of the user.

As such, as illustrated in FIG. 5, game difficulty level may influence the user's progression through the game which in turn influences the user's behavior regarding the game. Thus, the difficulty of the game may be dynamically set and adjusted in order to influence the user's behavior in playing the game.

Example Dynamic Difficulty Configuration Process

Figure 6:
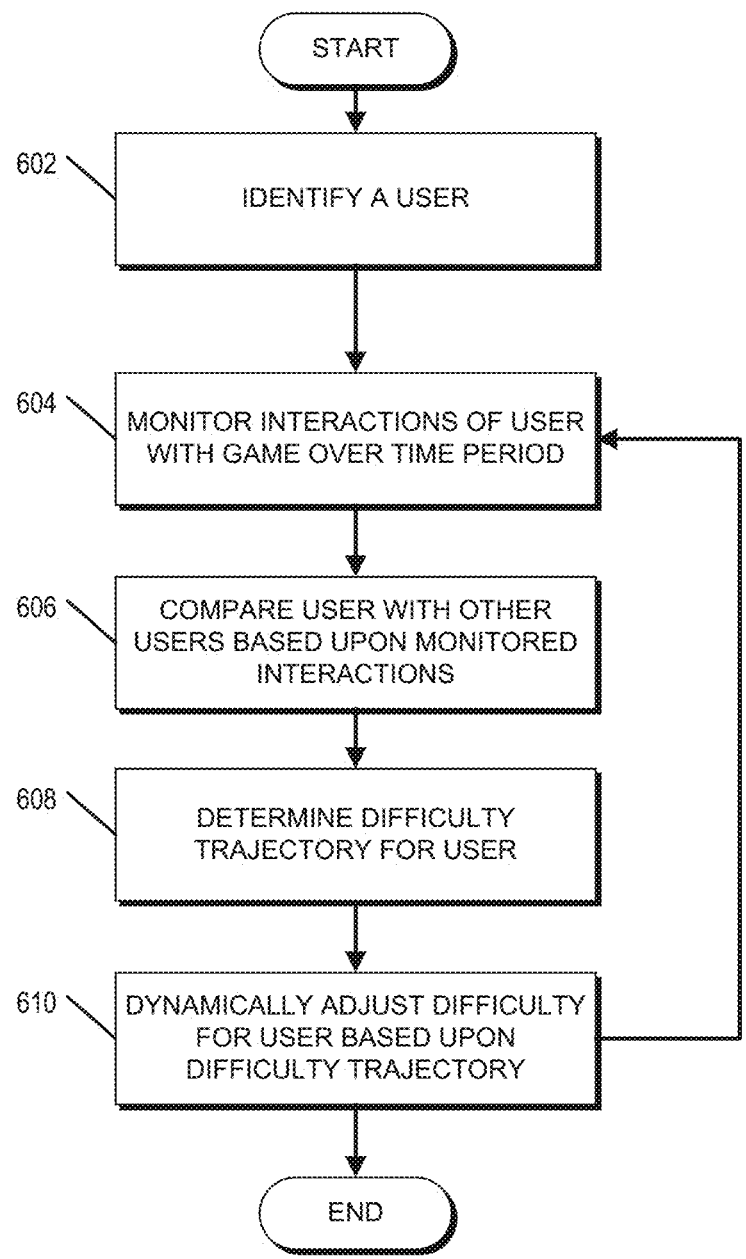
FIG. 6 illustrates a flowchart of an embodiment of a dynamic difficulty configuration process.

FIG. 6 presents a flowchart of an embodiment of a dynamic difficulty configuration process 600. The process 600 can be implemented by any system that can be used to dynamically adjust a difficulty of a video game for a user. For example, the process 600 can, in whole or in part, be performed by user computing system 110 and interactive computing system 130 (for example, using difficulty configuration system 132 to determine a difficulty trajectory based upon a predictive model 160, which may be used to manipulate one or more gameplay parameters 114). Although any number of systems, in whole or in part, can implement the process 600, to simplify discussion, the process 600 will be described with respect to particular systems. Further, it should be understood that the process 600 may be updated or performed repeatedly over time. For example, the process 600 may be repeated for each play session of a video game 112, for each round of the video game 112, each week, each month, for every threshold number of play sessions, for every threshold number of times a user loses or fails to complete an objective, each time a win ratio drops below a threshold level, and the like. However, the process 600 may be performed more or less frequently.

The process 600 begins at block 602 where the interactive computing system 130 identifies a user. In some embodiments, the user may be identified in response to the user beginning a game session at the user computing system 110. In some embodiments, identifying information of the user, such as account name, password, IP address, and/or the like (collectively referred to as a user identifier) may be received and used to identify the user.

At block 604, after the user has been identified (for example, using a user identifier), the interactive computing system 130 may monitor or record interactions of the user with the game over a time period. For example, user data associated with the user may be collected during the course of a gameplay session by the user, and stored in a user data repository 138. In some embodiments, user data may be collected and stored in the user data repository 138 in substantially real-time (for example, as the user plays the game during a session), while in other embodiments, user data may be transmitted and stored in the user data repository 138 at defined intervals (for example, at designated times, at the end of a session, and/or the like). The user data may comprise any data related to how the user interacts with the game (for example, user actions performed in the course of gameplay, time play, levels cleared, win/loss ratio, user attempts per level, and/or the like). In some embodiments, the collected user data may be used to construct or update a user profile. The user profile may maintain a plurality of attributes for the user based upon the collected user data indicative of the user's progression through the game and/or the user's behavior in relation to the game (for example, total time played, average session length, average session frequency, average score, average number of attempts per level, and/or the like). In some embodiments, the user profile may be used to form an input set of data (for example, comprising one or more user attributes, collected user data 304, and/or the like).

At block 606, the difficulty optimization model 304 may compare the user data for the user with the user data of other users, based upon the monitored interactions of the user with the game. In some embodiments, calculated attributes associated with the user profile for the user may be compared with those of other users. In some embodiments, the user grouping system 134 may perform the comparison, using one or more attributes of the user as specified by the difficulty optimization model 304.

In some embodiments, when comparing the user with other users, associating the user with a user group, historical data for the user may be considered. In some embodiments, all historical data for the user may be considered, while in other embodiments, only historical data for the user that satisfies a threshold age or that is more recent than a particular threshold time period may be considered (for example, past week, past ten play sessions, and/or the like).

In some embodiments, the user may be associated with a user group (for example, using user grouping system 134). A user group may refer to any collection of one or more users having certain common characteristics, for example, game progression and user behavior characteristics. For example, the user may be associated with a group of users, wherein the users of the group have been recorded as having made, on average, a similar number of attempts at a particular level in a game, and in response have experienced a similar change in gameplay behavior (for example, frequency of sessions increased/decreased, and/or the like). As such, the users of a particular user group may have the same or similar predicted challenge level when playing the game. By associating a user with a user group, a predicted challenge level that is preferred by the user can be determined.

In some embodiments, comparing the user with other users and/or associating the user with a user group allows for a prediction model 160 such as the difficulty optimization model 304 to determine a predicted challenge level for the user. For example, in some embodiments, different users having certain similar attributes may have similar predicted levels of challenge. The difficulty optimization model 304 may identify the types of user data (for example, user interactions with the game) that are most relevant for the determining a predicted challenge level for the user. For example, it may be known for the difficulty optimization model 304 that a first user attribute is strongly correlated with the user's predicted challenge level, while a second user attribute has little to no correlation with the user's predicted challenge level. As such, the user may be compared with other users based upon the first user attribute but not the second user attribute.

In some embodiments, how users have historically responded to different difficulty levels of the video game may be tracked over time. For example, it may be determined that users of a particular group are likely to churn or stop playing the game when faced with certain difficulty levels, but are more likely to remain engaged at other difficulty levels.

In some embodiments, how users respond to different difficulty levels may be tracked at different portions of the game. For example, by tracking user behavior over time, it may be determined that users exhibiting certain characteristics when first starting to play the game are more likely to prefer certain difficulty levels as the game progresses. By tracking the trajectory of difficult for users who have progressed through the game, difficulty trajectories may be determined for other users that may not have progressed as far into the game.

At block 608, the difficulty optimization model 304 determines a difficulty trajectory for the user. In some embodiments, the difficulty trajectory may be based upon a current difficulty of the game and recorded user behavior in response to the current difficulty (for example, based upon the user profile for the user). In some embodiments, the difficulty trajectory may be determined in response to the comparison of the user with other users or the association of the user with a user group. For example, the difficulty trajectory determined for a user may be based upon difficulty trajectories associated with the other users and/or users of the same user group. In some embodiments, the difficulty trajectory may be determined by the difficulty configuration system 132 instead of the difficulty optimization model 304. In some embodiments, the difficulty trajectory may be based upon a set of determined optimal win rates for the user.

At block 610, the difficulty configuration system 132 may dynamically adjust the difficulty of the game for the user, based upon the determined difficulty trajectory. In some embodiments, adjusting the difficulty level of the game may comprise selecting a particular difficulty based gameplay parameter value corresponding to a desired difficulty level or by adjusting one or more gameplay parameters 114 of the video game 112. As the user continues to progress through the game, the difficulty of the game may continue to be adjusted in accordance with the determined difficulty trajectory.

In some embodiments, the process may return to block 604, where interactions of the user with the game continue to be monitored. In some embodiments, additional collected user data may be stored and used to update the user profile for the user. As a result, the difficulty trajectory associated with the player may be changed or updated.

In some cases, one or more of the above embodiments may be combined with predictive modeling use for predicting a churn or retention rate for the player. For example, churn prediction may be used to adjust a current difficulty of the game in response to an indication that the user may be likely to churn, while the difficulty trajectory may be used to adjust longer-term difficulty trends for the user.

Example Gameplay Parameter Evaluation Process

Figure 7:
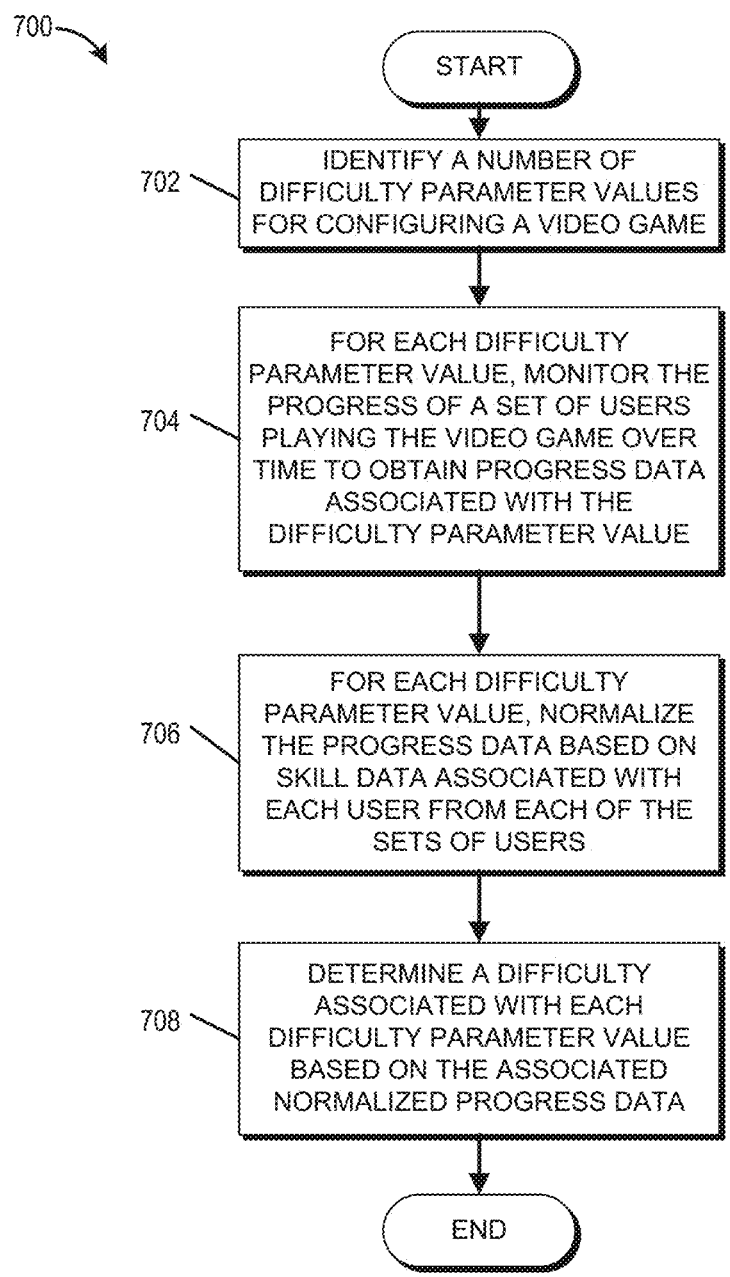
FIG. 7 illustrates a flowchart of an embodiment of a gameplay parameter evaluation process.

FIG. 7 presents a flowchart of an embodiment of a gameplay parameter value evaluation process 700. The process 700 can be implemented by any system that can evaluate the difficulty of a portion of the video game 112 based at least in part on the use of a particular seed value with respect to the portion of the video game 112. For example, the process 700, in whole or in part, can be implemented by an interactive computing system 130, a gameplay evaluation system 136, a difficulty configuration system 132, or a user computing system 110, among others. Although any number of systems, in whole or in part, can implement the process 700, to simplify discussion, the process 700 will be described with respect to particular systems.

The gameplay parameter evaluated using the process 700 can relate to the generation of a number of aspects or portions of the video game 112. For example, the gameplay parameter may correspond to a seed to be used to determine an initial configuration of an in-game world or level. As another example, the gameplay parameter may be used to determine the abilities of one or more playable or non-playable characters within the video game 112.

The process 700 begins at block 702 where the gameplay evaluation system 136 identifies a number of gameplay parameter values for configuring a video game 112 or a portion of the video game 112. In some cases, each of the number of values of a particular gameplay parameter may be associated with configuring the same portion of the video game 112. For example, a particular gameplay parameter used to configure an aspect of a particular level of a game may be associated with a plurality of possible gameplay parameter values of configuring the aspect of the level.

For each gameplay parameter value identified at the block 702, the gameplay evaluation system 136 monitors or receives data concerning the progress of a set of one or more users playing or accessing the video game 112 over time to obtain progress data associated with the gameplay parameter value at block 704. In some cases, each gameplay parameter value will be evaluated with a different set of users because, for example, only one gameplay parameter value may be used during a particular play session with a particular account of a particular user for some types of video games. For example, if the gameplay parameter value is associated with a layout of a particular level, it is possible that the layout of the particular level will not change once set for a particular user. As such, the particular user will not be able to encounter other values of the gameplay parameter. However, in some other cases, each gameplay parameter value may be evaluated with the same set of users because, for example, the gameplay parameter values are used repeatedly during play sessions of the video game. For example, if the gameplay parameter value is associated with a starting set of cards in a card battle game, a starting set of cards may be generated each time the user plays a round providing an opportunity for a number of different gameplay parameter values to be evaluated with a particular user.

In some implementations, the set of users monitored at the block 704 are selected based on the skill level associated with the set of users or a user group associated with a set of users. For example, each of the gameplay parameter values may be evaluated by users who are determined to have roughly the same skill level. Alternatively, each of the gameplay parameter values may be evaluated by a number of users with varying degrees of skill.

The progress data obtained at the block 704 may reflect the amount of progress that the monitored users have made playing the video game 112 with a particular gameplay parameter value. For example, the progress data may indicate whether a particular user or set of users completed an objective with a particular gameplay parameter value or failed to complete an objective with the particular gameplay parameter value. In some embodiments, the progress data may include other types of metrics, such as a number of attempts made by the users to complete a particular object with a particular gameplay parameter value, a failure/success rate associated with the objective, time to complete the objective, number of actions taken to complete the objective, spend associated with completing the objective, a score associated with completing the objective, and/or the like. In some embodiments, the progress data may be collected and stored in substantially real-time, or may be stored at designated times (for example, at certain intervals, at the end of a play session, etc.).

In some embodiments, gameplay parameter values may be evaluated using automated agents running defined routines ("bots"). Each routine may be used to simulate gameplay by stepping through a plurality of gameplay states of the video game 112. In some embodiments, different automated routines may be associated with different rules or procedures for stepping through the gameplay states of the video game 112. For example, in some embodiments, a first routine may step through the gameplay states in a random manner, while a second routine may be configured to prioritize certain types of states or types of gameplay actions that may lead to certain states. In some embodiments, each automated routine may be associated with a skill level, based upon how well they are able to complete objectives in the video game 112. In some embodiments, each type of automated routine may be run against the video game 112 configured using the gameplay parameter value, in order to collect progress data associated with the routine. In some embodiments, the gameplay parameter values may be evaluated using a combination of real users and automated routines.

At block 706, for each gameplay parameter value evaluated, the gameplay parameter evaluation system 136 normalizes the progress data based on skill data associated with each user from each of the sets of users. In other words, in some cases, the progress data obtained for each of the gameplay parameter values may be normalized so that the different skill levels of different users do not impact the evaluation of the gameplay parameter values. Alternatively, or in addition, progress data obtained with respect to a particular user for a gameplay parameter value may be weighted based on the user's skill level as determined by, for example, the user grouping system 134. In some cases, a particular user's skill level may be determined based on points earned playing the video game 112 or some other metric for monitoring the skills of the particular user.

In some embodiments, by normalizing and/or weighting the collected progress data associated with a gameplay parameter value based upon user skill levels, the difficult associated with the gameplay parameter value may be more accurately determined. For example, the progress data of users indicating high failure rates of an objective configured using the gameplay parameter value may be more indicative of a high difficulty level associated with the gameplay parameter value if the users are of high skill level, as opposed to the users being of low skill level.

In some embodiments, the block 706 may be optional or omitted. For example, in cases where the set of users selected for data collection to evaluate each value of a particular gameplay parameter is associated with a particular user group or are each determined to have less than a threshold difference of skill level, it may be unnecessary to normalize the progress data and the block 706 may be omitted.

At block 708, the gameplay evaluation system 136 determines a difficulty associated with each gameplay parameter value based on the associated progress data. The difficulty may be determined based on the number or percentage of users who are successful or unsuccessful in completing an objective or a portion of the video game 112 when a particular gameplay parameter value associated with the objective or the portion of the video game 112 is used. Advantageously, in certain embodiments, by evaluating the difficulty of gameplay parameter values, it is possible to group sets of gameplay parameter values based upon their associated difficulty levels. For example, each gameplay parameter value may be classified, such as "easy," "medium", or "hard." Thus, in some cases, if it is determined that a particular user prefers to play easier video games, gameplay parameter values that are associated with a lower difficulty level may be used to generate portions of the video game 112.

Further, the process 700 enables developers to confirm the level of difficulty associated with a particular gameplay parameter value and to make adjustments to the classification of a particular gameplay parameter value. For example, a particular gameplay parameter value may be used with players who select an easy difficulty level. However, after evaluating a number of play sessions for a number of users with the particular seed value using the process 700, it may be determined that the gameplay parameter value causes a portion of the video game 112 to be significantly more challenging than when the portion of the video game 112 is associated with other seed values. In such a case, the particular gameplay parameter value may be reclassified for use with players who prefer or select a harder difficulty level and may be removed from availability for use with players who prefer or select an easy difficulty level.

In some embodiments, a developer may be presented with a user interface displaying data associated with users for which a particular gameplay parameter value was used. The data may include one or more user metrics, such as how many users completed a portion of the game associated with the gameplay parameter value, an average number of attempts by users to complete the portion of the game, churn rate of users at the portion of the game, and/or the like. The developer may use this data to determine whether or not the portion of the game associated with the gameplay parameter value is more or less difficult than expected. For example, if the developer determines using the user interface that a large number of players are churning or needing to make a larger than expected number of attempts to complete the portion of the game, it may be inferred that the particular gameplay parameter value is associated with too high of a difficulty level, and may be adjusted accordingly or associated with a more appropriate difficulty level.

Adjusting Difficulty Level for Users Based Upon Difficulty Trajectory

Figure 8:
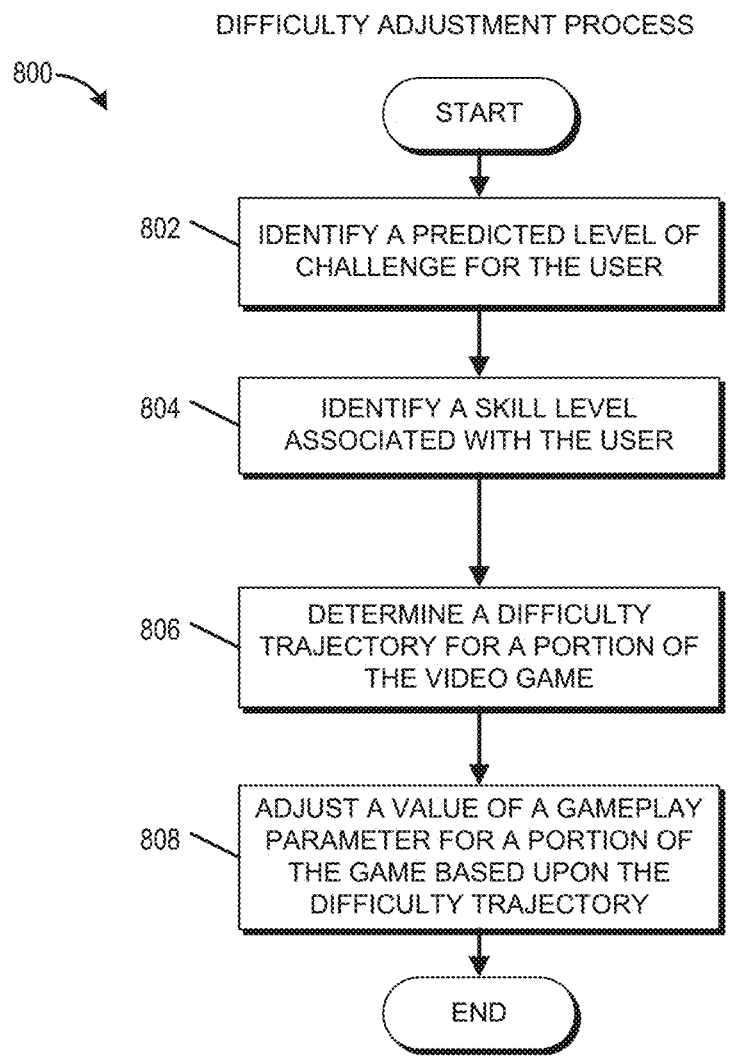
FIG. 8 illustrates a flowchart of an embodiment of a difficulty adjustment process.

As discussed above, a difficulty trajectory may be used to set a difficulty level of a game for a particular user throughout different portions of the game, in order to maintain a predicted level of challenge for the user. FIG. 8 provides an embodiment of a flowchart of a process for adjusting a difficulty level of a video game of a particular user. The process 800 can be implemented by any system that can be used to dynamically adjust a difficulty of a video game for a user. For example, the process 800 can, in whole or in part, be performed by user computing system 110 and interactive computing system 130 (for example, using difficulty configuration system 132 to determine a difficulty trajectory based upon a predictive model 160, which may be used to manipulate one or more gameplay parameters 114). Although any number of systems, in whole or in part, can implement the process 800, to simplify discussion, the process 800 will be described with respect to particular systems. Further, it should be understood that the process 800 may be updated or performed repeatedly over time. For example, the process 800 may be repeated for each play session of a video game 112, for each round of the video game 112, each week, each month, for every threshold number of play sessions, for every threshold number of times a user loses or fails to complete an objective, each time a win ratio drops below a threshold level, and the like. However, the process 800 may be performed more or less frequently.

At block 802, the difficulty optimization model 304 identifies a predicted level of challenge for the user. As discussed above, in some embodiments, the predicted level of challenge may indicate a relative level of difficulty that maintains an engagement level of the user through the course of gameplay. In some embodiments, the predicted level of challenge may be determined based upon one or more user attributes stored in the user data repository 138. In some embodiments, the predicted level of challenge may At block 804, the difficulty optimization model 304 may identify a skill level associated with the user. In some embodiments, a skill level of the user may be based upon various collected user data 304, such as scores, win/loss record, completion of objectives in the game, number of attempts to complete objections in the game, and/or the like.

At block 806, the difficulty optimization model 304 uses the predicted level of challenge and the user skill level to determine a difficulty trajectory for the user. The difficulty trajectory may indicate difficulty levels for the user throughout different portions of the game. In some embodiments, a difficulty level of the difficulty trajectory may be set based upon the skill level of the user and the predicted level of challenge. In some embodiments, the difficulty level may be expressed as a sum or aggregation of the skill level of the user and the predicted level of challenge. For example, a difficulty level for a first player of low skill but a high predicted level of challenge may in some embodiments be similar to a difficulty level of a player of high skill but low predicted level of challenge, but be lower than a difficulty level of a player of high skill with a high level of challenge. In some embodiments, the difficulty trajectory may indicate difficulty levels of some portions of the game for the user based upon an expected future skill level of the user.

At block 808, a value of a gameplay parameter for a portion of the game may be adjusted for the user. In some embodiments, the portion of the game may be associated with a difficulty level (for example, based upon the determined difficulty trajectory). In order to adjust the difficulty level of the portion of the game, a gameplay parameter associated with the portion of the game may be identified. The gameplay parameter may have a plurality of different possible values. Each value may be associated with a difficulty level. In some embodiments, the difficulty level of each gameplay parameter value may be determined using the process illustrated in FIG. 7. The difficulty optimizer 310 may thus set the difficulty level of a portion of the game by selecting a value of the gameplay parameter associated with the portion and having a corresponding level of difficulty.

Game Updates Based Upon Difficulty Level

In some embodiments, collected user data of a plurality of users analyzed by difficulty optimization model 304 may be used by a game developer in order to update and improve a difficulty of a game. For example, in some embodiments, certain portions of the game may include an unexpected change in difficulty for many players. If it is detected that many users are performing more poorly than expected in a particular portion of the game (for example, lower scores, more attempts required to progress, and/or the like), a flag may be set that indicates that the portion of the game is more difficult than intended. These deviations from an expected difficulty trajectory may be brought to the attention of a game developer, such that appropriate changes may be made.

Figure 9:
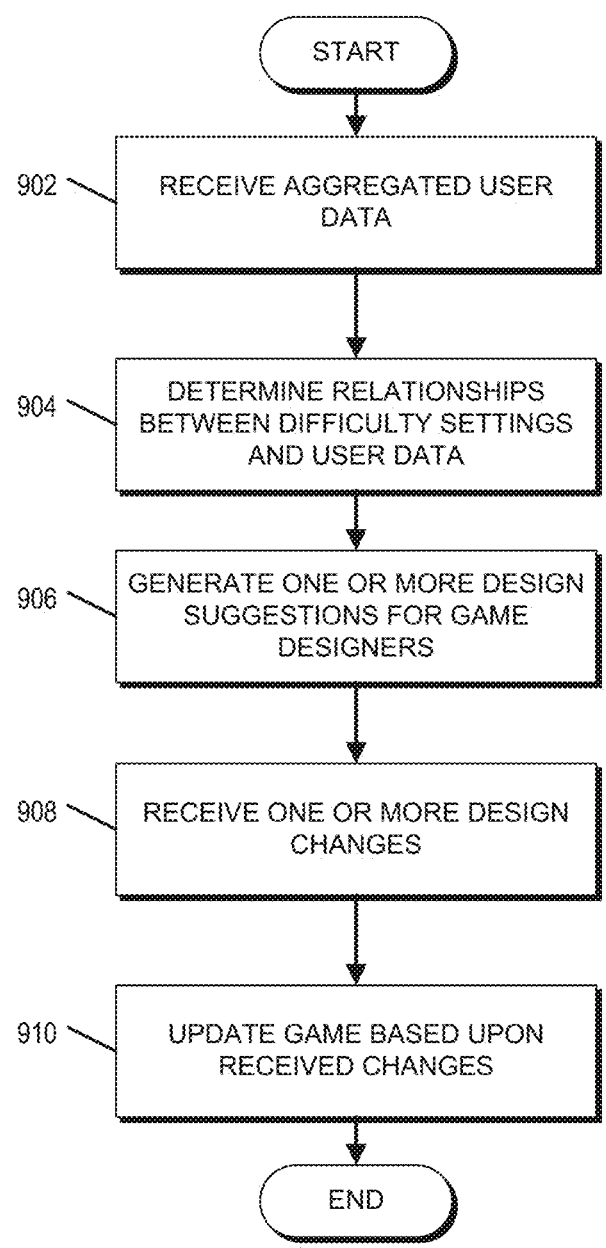
FIG. 9 illustrates a flowchart of an embodiment of a process for updating a game based upon difficulty level.

FIG. 9 presents a flowchart of a process for updating a game based upon difficulty level, in accordance with some embodiments. The process 900 can be implemented by any system that can be used to collect data regarding a difficulty of a video game and user interactions with the video game. For example, the process 900 can, in whole or in part, be performed by user computing system 110 and interactive computing system 130 (for example, using difficulty configuration system 132 in conjunction with user interaction history 116 to determine how users are reacting to different portions of the game and different difficulty levels). Although any number of systems, in whole or in part, can implement the process 900, to simplify discussion, the process 900 will be described with respect to particular systems. Further, it should be understood that the process 900 may be updated or performed repeatedly over time. For example, the process 900 may be repeated for each play session of a video game 112, for each round of the video game 112, each week, each month, for every threshold number of play sessions, for every threshold number of times a user loses or fails to complete an objective, each time a win ratio drops below a threshold level, and the like. However, the process 900 may be performed more or less frequently.

At block 902, the recommendation system 314 may receive aggregated user data associated with a plurality of users. In some embodiments, the data may comprise user profile data for the plurality of users, as well as difficulty adjustment data and/or difficulty trajectory data associated with the plurality of users.

In some embodiments, data associated with one or more bots may also be received. For example, the data may comprise attributes of the one or bots, such as bot behavioral scheme, bot skill level, and/or the like, as well data associated with bot gameplay performance.

At block 904, the recommendation system 314 may determine one or more relationships between difficulty settings and user data. In some embodiments, a relationship may correspond to a deviation between an expected difficulty trajectory for the plurality of users, and a detected behavior of the plurality of users. For example, the difficulty trajectory for the user may intend for the user to face a certain degree of challenge at a particular portion of the game. However, the detected behavior of the user (for example, win/loss record, number of attempts, and/or the like) may indicate that the user is being over- or under-challenged at the particular portion of the game, and that the portion of the game is more or less difficult than expected. For instance, it may be determined that users are failing a particular portion of the game more often than their respective difficulty levels of the portion of the game would otherwise indicate. In some embodiments, it may be determined that many users, when reaching a particular portion of the game, experience a change in their difficult trajectory, which may indicate anomalous difficulty at the portion of the game.

In some embodiments, an anomalous difficulty of a portion of the game may be automatically identified in response to a difference between an expected behavior of a plurality of users at the portion of the game and the actual behavior meets a threshold value. The behavior may comprise success rate at completing the portion of the game, amount of moves or in-game resources expended to complete the portion of the game, score when completing the portion of the game, length and/or frequency of play sessions when completing the portion of the game, churn rates at the portion of the game, and/or the like. For example, the portion of the game may be configured such that users having a particular difficulty trajectory will be typically expected to expend a certain amount of moves or in-game resources in order to complete the portion of the game. If the actual amount of resources expended by the users in completing the portion of the game is larger than the expected amount by a threshold amount, the portion of the game may be considered to be anomalously difficult. In some embodiments, a flag may be set that indicates the anomalous difficulty level of the portion of the game.

In some embodiments, one or more relationships between difficulty setting and bot data may be determined. For example, a particular portion of the game associated with a particular gameplay parameter value may be expected to have a certain difficulty level. Bot data indicating how one or more bots were able to perform at the portion of the game may be used to determine whether the portion of the game is more or less difficult than expected. For example, it may be expected that a particular portion of the game will typically require bots having a particular behavior or skill level a certain amount of time to complete. If it is determined that the one or more bots are able to complete the portion of the game in significantly less time, then it may be determined that the portion of the game is less difficult than expected.

At block 906, the recommendation system 314 may generate one or more design suggestions a game developer, based upon the determined relationships between difficulty settings and user data. For example, as discussed above, a determination may be made that a particular portion of the game is more or less difficult than expected. As a result, a design suggestion may be made to the game developer to make particular portion of the game less or more difficult, allowing more users playing the game to maintain their expected difficulty trajectory. In some embodiments, the one or more design suggestions may specify one or more particular gameplay parameters associated with the particular portion of the game associated with the determined relationships. For example, if it is determined that the portion of the game is more difficult than expected, the suggestion may identify one or more gameplay parameters associated with the portion of the game that can be modified by a game developer to change the difficulty of the portion of the game. For example, the suggestion may comprise restricting the portion of the game to certain gameplay parameter values associated with a desired difficulty level, adjusting the effect of certain gameplay parameter values on the video game to change the difficulty level associated with the adjusted gameplay parameter values, and/or the like.

At block 908, the game receives one or more design changes from a game developer. In some embodiments, the design change may adjust one or more gameplay parameter values (for example, how the gameplay parameter value affects a state of the video game) or restricting one or more gameplay parameters to certain values. At block 910, the game is updated based upon the received changes.

Overview of Computing System

Figure 10:
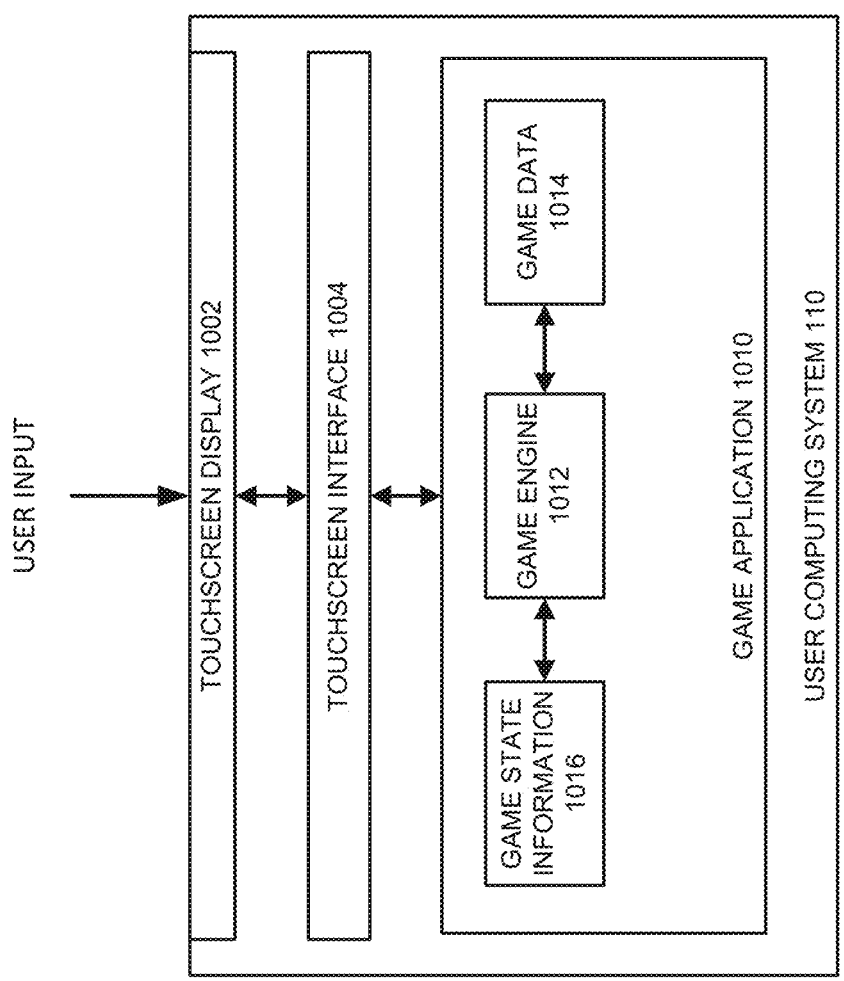
FIG. 10 illustrates an embodiment of a user computing system, which may also be referred to as a gaming system.

FIG. 10 illustrates an embodiment of a user computing system 110, which may also be referred to as a gaming system. As illustrated, the user computing system 110 may be a single computing device that can include a number of elements. However, in some cases, the user computing system 110 may include multiple devices. For example, the user computing system 110 may include one device that includes that includes a central processing unit and a graphics processing unit, another device that includes a display, and another device that includes an input mechanism, such as a keyboard or mouse.

The user computing system 110 can be an embodiment of a computing system that can execute a game system. In the non-limiting example of FIG. 8, the user computing system 110 is a touch-capable computing device capable of receiving input from a user via a touchscreen display 1002. However, the user computing system 110 is not limited as such and may include non-touch capable embodiments, which do not include a touchscreen display 1002.

The user computing system 110 includes a touchscreen display 1002 and a touchscreen interface 1004, and is configured to execute a game application 1010. This game application may be the video game 112 or an application that executes in conjunction with or in support of the video game 112, such as a video game execution environment. Although described as a game application 1010, in some embodiments the application 1010 may be another type of application that may have a variable execution state based at least in part on the preferences or capabilities of a user, such as educational software. While user computing system 110 includes the touchscreen display 1002, it is recognized that a variety of input devices may be used in addition to or in place of the touchscreen display 1002.

The user computing system 110 can include one or more processors, such as central processing units (CPUs), graphics processing units (GPUs), and accelerated processing units (APUs). Further, the user computing system 110 may include one or more data storage elements. In some embodiments, the user computing system 110 can be a specialized computing device created for the purpose of executing game applications 1010. For example, the user computing system 110 may be a video game console. The game applications 1010 executed by the user computing system 110 may be created using a particular application programming interface (API) or compiled into a particular instruction set that may be specific to the user computing system 110. In some embodiments, the user computing system 110 may be a general purpose computing device capable of executing game applications 1010 and non-game applications. For example, the user computing system 110 may be a laptop with an integrated touchscreen display or desktop computer with an external touchscreen display. Components of an example embodiment of a user computing system 110 are described in more detail with respect to FIG. 9.

The touchscreen display 1002 can be a capacitive touchscreen, a resistive touchscreen, a surface acoustic wave touchscreen, or other type of touchscreen technology that is configured to receive tactile inputs, also referred to as touch inputs, from a user. For example, the touch inputs can be received via a finger touching the screen, multiple fingers touching the screen, a stylus, or other stimuli that can be used to register a touch input on the touchscreen display 1002. The touchscreen interface 1004 can be configured to translate the touch input into data and output the data such that it can be interpreted by components of the user computing system 110, such as an operating system and the game application 1010. The touchscreen interface 1004 can translate characteristics of the tactile touch input touch into touch input data. Some example characteristics of a touch input can include, shape, size, pressure, location, direction, momentum, duration, and/or other characteristics. The touchscreen interface 1004 can be configured to determine the type of touch input, such as, for example a tap (for example, touch and release at a single location) or a swipe (for example, movement through a plurality of locations on touchscreen in a single touch input). The touchscreen interface 1004 can be configured to detect and output touch input data associated with multiple touch inputs occurring simultaneously or substantially in parallel. In some cases, the simultaneous touch inputs may include instances where a user maintains a first touch on the touchscreen display 1002 while subsequently performing a second touch on the touchscreen display 1002. The touchscreen interface 1004 can be configured to detect movement of the touch inputs. The touch input data can be transmitted to components of the user computing system 110 for processing. For example, the touch input data can be transmitted directly to the game application 1010 for processing.

In some embodiments, the touch input data can undergo processing and/or filtering by the touchscreen interface 1004, an operating system, or other components prior to being output to the game application 1010. As one example, raw touch input data can be captured from a touch input. The raw data can be filtered to remove background noise, pressure values associated with the input can be measured, and location coordinates associated with the touch input can be calculated. The type of touch input data provided to the game application 1010 can be dependent upon the specific implementation of the touchscreen interface 1004 and the particular API associated with the touchscreen interface 1004. In some embodiments, the touch input data can include location coordinates of the touch input. The touch signal data can be output at a defined frequency. Processing the touch inputs can be computed many times per second and the touch input data can be output to the game application for further processing.

A game application 1010 can be configured to be executed on the user computing system 110. The game application 1010 may also be referred to as a video game, a game, game code and/or a game program. A game application should be understood to include software code that a user computing system 110 can use to provide a game for a user to play. A game application 1010 might comprise software code that informs a user computing system 110 of processor instructions to execute, but might also include data used in the playing of the game, such as data relating to constants, images and other data structures. For example, in the illustrated embodiment, the game application includes a game engine 912, game data 914, and game state information 916.

The touchscreen interface 1004 or another component of the user computing system 110, such as the operating system, can provide user input, such as touch inputs, to the game application 1010. In some embodiments, the user computing system 110 may include alternative or additional user input devices, such as a mouse, a keyboard, a camera, a game controller, and the like. A user can interact with the game application 1010 via the touchscreen interface 1004 and/or one or more of the alternative or additional user input devices. The game engine 912 can be configured to execute aspects of the operation of the game application 1010 within the user computing system 110. Execution of aspects of gameplay within a game application can be based, at least in part, on the user input received, the game data 914, and game state information 916. The game data 914 can include game rules, prerecorded motion capture poses/paths, environmental settings, constraints, animation reference curves, skeleton models, and/or other game application information. Further, the game data 914 may include information that is used to set or adjust the difficulty of the game application 1010.

The game engine 912 can execute gameplay within the game according to the game rules. Some examples of game rules can include rules for scoring, possible inputs, actions/events, movement in response to inputs, and the like. Other components can control what inputs are accepted and how the game progresses, and other aspects of gameplay. During execution of the game application 1010, the game application 1010 can store game state information 916, which can include character states, environment states, scene object storage, and/or other information associated with a state of execution of the game application 1010. For example, the game state information 916 can identify the state of the game application at a specific point in time, such as a character position, character action, game level attributes, and other information contributing to a state of the game application.

The game engine 912 can receive the user inputs and determine in-game events, such as actions, collisions, runs, throws, attacks and other events appropriate for the game application 1010. During operation, the game engine 912 can read in game data 914 and game state information 916 in order to determine the appropriate in-game events. In one example, after the game engine 912 determines the character events, the character events can be conveyed to a movement engine that can determine the appropriate motions the characters should make in response to the events and passes those motions on to an animation engine. The animation engine can determine new poses for the characters and provide the new poses to a skinning and rendering engine. The skinning and rendering engine, in turn, can provide character images to an object combiner in order to combine animate, inanimate, and background objects into a full scene. The full scene can conveyed to a renderer, which can generate a new frame for display to the user. The process can be repeated for rendering each frame during execution of the game application. Though the process has been described in the context of a character, the process can be applied to any process for processing events and rendering the output for display to a user.

Example Hardware Configuration of Computing System

Figure 11:
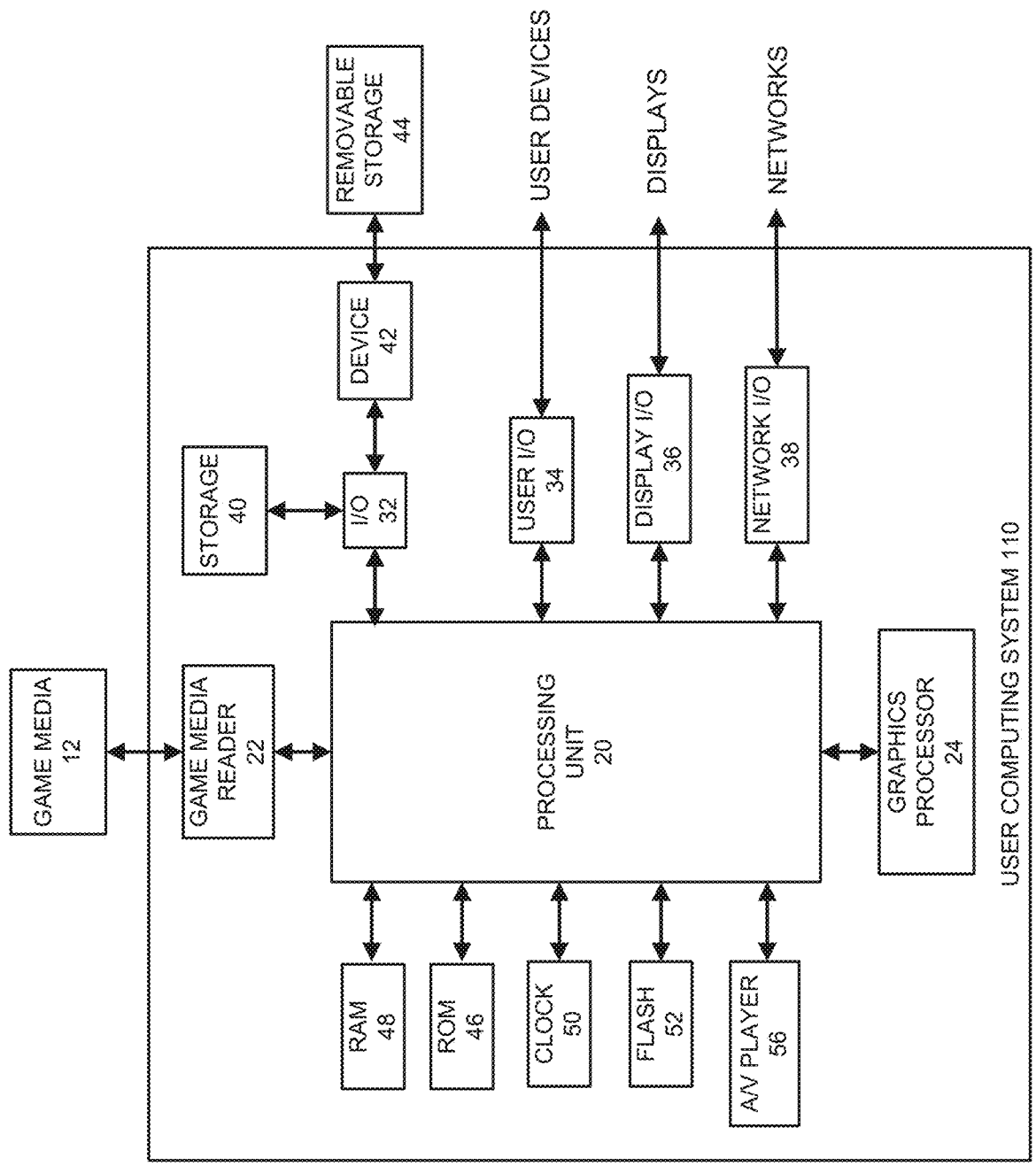
FIG. 11 illustrates an embodiment of a hardware configuration for the user computing system of FIG. 10.

FIG. 11 illustrates an embodiment of a hardware configuration for the user computing system 110 of FIG. 10. Other variations of the user computing system 110 may be substituted for the examples explicitly presented herein, such as removing or adding components to the user computing system 110. The user computing system 110 may include a dedicated game device, a smart phone, a tablet, a personal computer, a desktop, a laptop, a smart television, a car console display, and the like. Further, (although not explicitly illustrated in FIG. 11) as described with respect to FIG. 10, the user computing system 110 may optionally include a touchscreen display 1002 and a touchscreen interface 1004.

As shown, the user computing system 110 includes a processing unit 20 that interacts with other components of the user computing system 110 and also components external to the user computing system 110. A game media reader 22 may be included that can communicate with game media 12. Game media reader 22 may be an optical disc reader capable of reading optical discs, such as CD-ROM or DVDs, or any other type of reader that can receive and read data from game media 12. In some embodiments, the game media reader 22 may be optional or omitted. For example, game content or applications may be accessed over a network via the network I/O 38 rendering the game media reader 22 and/or the game media 12 optional.

The user computing system 110 may include a separate graphics processor 24. In some cases, the graphics processor 24 may be built into the processing unit 20, such as with an APU. In some such cases, the graphics processor 24 may share Random Access Memory (RAM) with the processing unit 20. Alternatively, or in addition, the user computing system 110 may include a discrete graphics processor 24 that is separate from the processing unit 20. In some such cases, the graphics processor 24 may have separate RAM from the processing unit 20. Further, in some cases, the graphics processor 24 may work in conjunction with one or more additional graphics processors and/or with an embedded or non-discrete graphics processing unit, which may be embedded into a motherboard and which is sometimes referred to as an on-board graphics chip or device.

The user computing system 110 also includes various components for enabling input/output, such as an I/O 32, a user I/O 34, a display I/O 36, and a network I/O 38. As previously described, the input/output components may, in some cases, including touch-enabled devices. The I/O 32 interacts with storage element 40 and, through a device 42, removable storage media 44 in order to provide storage for computing device 110. Processing unit 20 can communicate through I/O 32 to store data, such as game state data and any shared data files. In addition to storage 40 and removable storage media 44, computing device 110 is also shown including ROM (Read-Only Memory) 46 and RAM 48. RAM 48 may be used for data that is accessed frequently, such as when a game is being played.

User I/O 34 is used to send and receive commands between processing unit 20 and user devices, such as game controllers. In some embodiments, the user I/O 34 can include touchscreen inputs. As previously described, the touchscreen can be a capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online.

Display output signals may be produced by the display I/O 36 and can include signals for displaying visual content produced by the computing device 800 on a display device, such as graphics, user interfaces, video, and/or other visual content. The user computing system 110 may comprise one or more integrated displays configured to receive display output signals produced by the display I/O 36, which may be output for display to a user. According to some embodiments, display output signals produced by the display I/O 36 may also be output to one or more display devices external to the computing device 800.

The user computing system 110 can also include other features that may be used with a game, such as a clock 50, flash memory 52, and other components. An audio/video player 56 might also be used to play a video sequence, such as a movie. It should be understood that other components may be provided in the user computing system 110 and that a person skilled in the art will appreciate other variations of the user computing system 110.

Program code can be stored in ROM 46, RAM 48, or storage 40 (which might comprise hard disk, other magnetic storage, optical storage, solid state drives, and/or other non-volatile storage, or a combination or variation of these). At least part of the program code can be stored in ROM that is programmable (ROM, PROM, EPROM, EEPROM, and so forth), in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the play of the game and portions thereof might also be reserved for frame buffers, game state and/or other data needed or usable for interpreting user input and generating game displays. Generally, RAM 48 is volatile storage and data stored within RAM 48 may be lost when the user computing system 110 is turned off or loses power.

As user computing system 110 reads game media 12 and provides a game, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

Additional Embodiments

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method comprising:
   under control of one or more hardware computing devices configured with specific computer-executable instructions, the specific computer-executable instructions stored in an electronic hardware memory,
      receiving, over a network from a user computing system, a gameplay session data packet comprising an indication of initiation of a current gameplay session of a video game application at a first gameplay level of a plurality of gameplay levels on the user computing system;
      identifying a user identifier associated with the current gameplay session of the video game application on the user computing system from the gameplay session data packet, the user identifier associated with a user account;
      accessing user account data in a physical data store based at least in part on the user identifier, wherein the physical data store is configured to store user account data structures storing user interaction data associated with one or more gameplay sessions of the video game application;
      accessing a user specific difficulty trajectory associated with progression of the user account through the video game application, wherein the user specific difficulty trajectory is generated based at least in part on an analysis of at least a portion of the user account data using a difficulty analysis model, wherein the user specific difficulty trajectory identifies a predicted challenge level for each gameplay level of the plurality of gameplay levels within the video game application, wherein each gameplay level can be one of a plurality of different challenge levels;
      determining a first difficulty level for the first gameplay level of the current gameplay session of the video game application using the predicted challenge level identified for the first gameplay level by the user specific difficulty trajectory and gameplay session data associated with the current gameplay session, wherein each gameplay level can be one of a plurality of different difficulty levels;
      based at least in part on the determined first difficulty level, selecting a value for at least one gameplay parameter associated with the video game application, wherein the at least one gameplay parameter comprises a variable that when adjusted causes a modification to a state of the video game application; and
      modifying execution of the video game application by adjusting the at least one gameplay parameter to the selected value for the first gameplay level of the current gameplay session.

2. The computer-implemented method of claim 1, wherein the user interaction data comprises recent user interaction data that is more recent than a threshold age time period and historical user interaction data that less recent than the threshold age time period.

3. The computer-implemented method of claim 1, wherein the determined difficulty first level is further determined based at least in part on a skill level associated with the user account.

4. The computer-implemented method of claim 1, wherein the user specific difficulty trajectory is based on a win rate calculated for the user account to satisfy a threshold level of engagement during gameplay sessions of the video game application.

5. The computer-implemented method of claim 1, wherein the at least one gameplay parameter is a seed value that identifies seed data used to generate a gameplay level within the video game application.

6. The computer-implemented method of claim 1, wherein modifying execution of the video game application by adjusting the gameplay parameter to the selected value for the current gameplay session occurs prior to initiation of each gameplay level during the current gameplay session.

7. The computer-implemented method of claim 1, further comprising:
  determining a relationship between the user specific difficulty trajectory and a detected level of difficulty associated with the user account;
  based upon the determined relationship, generating one or more design recommendations; and
  updating the video game application based upon the one or more design recommendation.

8. A system comprising:
  an electronic data store configured to store user account data structures storing user interaction data associated with one or more gameplay sessions of a video game application;
  a hardware processor in communication with the electronic data store, the hardware processor configured to execute specific computer-executable instructions to at least:
    receive, over a network from a user computing system, a gameplay session data packet comprising an indication of initiation of a current gameplay session of a video game application at a first gameplay level of a plurality of gameplay levels on the user computing system;
    identify a user identifier associated with the current gameplay session of the video game application on the user computing device system from the gameplay session data packet, the user identifier associated with a user account;
    access user account data in a physical data store based at least in part on the user identifier, wherein the physical data store is configured to store user account data structures storing user interaction data associated with one or more gameplay sessions of the video game application;
    access a user specific difficulty trajectory associated with progression of the user account through the video game application, wherein the user specific difficulty trajectory is generated based at least in part on an analysis of at least a portion of the user account data using a difficulty analysis model, wherein the user specific difficulty trajectory identifies a predicted challenge level for each gameplay level of the plurality of gameplay levels within the video game application, wherein each gameplay level can be one of a plurality of different challenge levels;
    determine a first difficulty level for the first gameplay level of the current gameplay session of the video game application using the predicted challenge level identified for the first gameplay level by the user specific difficulty trajectory and gameplay session data associated with the current gameplay session, wherein each gameplay level can be one of a plurality of different difficulty levels;
    based at least in part on the determined first difficulty level, selecting a value for at least one gameplay parameter associated with the video game application, wherein the at least one gameplay parameter comprises a variable that when adjusted causes a modification to a state of the video game application; and
    modify execution of the video game application by adjusting the at least one gameplay parameter to the selected value for the current gameplay session.

9. The system of claim 8, wherein the user interaction data comprises recent user interaction data that is more recent than a threshold age time period and historical user interaction data that less recent than the threshold age time period.

10. The system of claim 8, wherein the determined first difficulty level is further determined based at least in part on a skill level associated with the user account.

11. The system of claim 8, wherein the user specific difficulty trajectory is based on a win rate calculated for the user account to satisfy a threshold level of engagement during gameplay sessions of the video game application.

12. The system of claim 8, wherein the at least one gameplay parameter is a seed value that identifies seed data used to generate a gameplay level within the video game application.

13. The system of claim 8, wherein modification of the execution of the video game application by adjusting the gameplay parameter to the selected value for the current gameplay session occurs prior to initiation of each gameplay level during the current gameplay session.

14. The system of claim 8, wherein the hardware processor is further configured to:
  determine a relationship between the user specific difficulty trajectory and a detected level of difficulty associated with the user account;
  based upon the determined relationship, generate one or more design recommendations; and
  update the video game application based upon the one or more design recommendation.

15. A non-transitory computer-readable storage medium storing computer executable instructions that, when executed by one or more computing devices, configure the one or more computing devices to perform operations comprising:
  receiving, over a network from a user computing system, a gameplay session data packet comprising an indication of initiation of a current gameplay session of a video game application at a first gameplay level of a plurality of gameplay levels on the user computing system;
  identifying a user identifier associated with the current gameplay session of the video game application on the user computing system from the gameplay session data packet, the user identifier associated with a user account;
  accessing user account data in a physical data store based at least in part on the user identifier, wherein the physical data store is configured to store user account data structures storing user interaction data associated with one or more gameplay sessions of the video game application;

accessing a user specific difficulty trajectory associated with progression of the user account through the video game application, wherein the user specific difficulty trajectory is generated based at least in part on an analysis of at least a portion of the user account data using a difficulty analysis model, wherein the user specific difficulty trajectory identifies a predicted challenge level for each gameplay level of the plurality of gameplay levels within the video game application, wherein each gameplay level can be one of a plurality of different challenge levels;

determining a first difficulty level for the first gameplay level of the current gameplay session of the video game application using the predicted challenge level identified for the first gameplay level by the user specific difficulty trajectory and gameplay session data associated with the current gameplay session, wherein each gameplay level can be one of a plurality of different difficulty levels;

based at least in part on the determined first difficulty level, selecting a value for at least one gameplay parameter associated with the video game application, wherein the at least one gameplay parameter comprises a variable that when adjusted causes a modification to a state of the video game application; and modifying execution of the video game application by adjusting the at least one gameplay parameter to the selected value for the current gameplay session.

16. The non-transitory computer-readable storage medium of claim 15, wherein the user interaction data comprises recent user interaction data that is more recent than a threshold age time period and historical user interaction data that less recent than the threshold age time period.

17. The non-transitory computer-readable storage medium of claim 15, wherein the determined first difficulty level is further determined based at least in part on a skill level associated with the user account.

18. The non-transitory computer-readable storage medium of claim 15, wherein the user specific difficulty trajectory is based on a win rate calculated for the user account to satisfy a threshold level of engagement during gameplay sessions of the video game application.

19. The non-transitory computer-readable storage medium of claim 15, wherein the at least one gameplay parameter is a seed value that identifies seed data used to generate a gameplay level within the video game application.

20. The non-transitory computer-readable storage medium of claim 15, wherein modifying execution of the video game application by adjusting the gameplay parameter to the selected value for the current gameplay session occurs prior to initiation of each gameplay level during the current gameplay session.

* * * * *

UNITED STATES PATENT AND TRADEMARK OFFICE
CERTIFICATE OF CORRECTION

| | | |
|---|---|---|
| PATENT NO. | : 11,413,539 B2 | Page 1 of 1 |
| APPLICATION NO. | : 16/518914 | |
| DATED | : August 16, 2022 | |
| INVENTOR(S) | : Navid Aghdaie et al. | |

It is certified that error appears in the above-identified patent and that said Letters Patent is hereby corrected as shown below:

On the Title Page

On Page 2, Column 1, Line 36, Item (56) under U.S. Patent Documents, delete "Colledi" and insert --Collodi--.

In the Drawings

On Sheet 10 of 14, FIG. 7, Line 1, above "START" insert --DIFFICULTY PARAMETER VALUE EVALUATION PROCESS--.

In the Specification

In Column 23, Line 64, delete "$c_{k,t}^{L}$" and insert --$c_{k,t}$--.

In Column 24, Line 16, delete "((state" and insert --(state--.

Signed and Sealed this
Eighth Day of November, 2022

Katherine Kelly Vidal
*Director of the United States Patent and Trademark Office*